United States Patent
Chen et al.

(10) Patent No.: US 12,105,954 B2
(45) Date of Patent: Oct. 1, 2024

(54) LCS DATA COMPRESSION/DECOMPRESSION SYSTEM

(71) Applicant: Dell Products L.P., Round Rock, TX (US)

(72) Inventors: Xiangping Chen, Sherborn, MA (US); Xunce Zhou, Shrewsbury, MA (US); Shyamkumar T. Iyer, Cedar Park, TX (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/864,118

(22) Filed: Jul. 13, 2022

(65) Prior Publication Data

US 2024/0020004 A1    Jan. 18, 2024

(51) Int. Cl.
*G06F 3/06* (2006.01)

(52) U.S. Cl.
CPC .......... *G06F 3/0608* (2013.01); *G06F 3/0653* (2013.01); *G06F 3/0659* (2013.01); *G06F 3/067* (2013.01)

(58) Field of Classification Search
CPC .... G06F 3/0608; G06F 3/0653; G06F 3/0659; G06F 3/067
See application file for complete search history.

(56) References Cited

U.S. PATENT DOCUMENTS

| | | | |
|---|---|---|---|
| 9,848,044 B2 | 12/2017 | Leggette et al. | |
| 10,824,374 B1* | 11/2020 | Gasser | G06F 3/0607 |
| 2015/0242309 A1* | 8/2015 | Talagala | G06F 3/064 |
| | | | 711/103 |
| 2022/0138156 A1* | 5/2022 | Wang | H04L 67/10 |
| | | | 707/740 |

* cited by examiner

*Primary Examiner* — Zachary K Huson
(74) *Attorney, Agent, or Firm* — Joseph Mencher

(57) ABSTRACT

An LCS data compression/decompression system includes an orchestrator device in a resource system with a host operating system and coupled to a storage system via a network. The orchestrator device receives a read instruction from the host operating system directed to data stored in the storage system and, in response, retrieves and uses a data read decompression policy to select one of the storage system and the orchestrator device to perform data decompression operations on the data. The orchestrator device then provides a data read decompression instruction to the storage system to cause the storage system to provide the data to the orchestrator device such that the orchestrator device provides the data to the host operation system after the one of the storage system and the orchestrator device selected using the data read decompression policy performs the data decompression operations on the data.

20 Claims, 22 Drawing Sheets

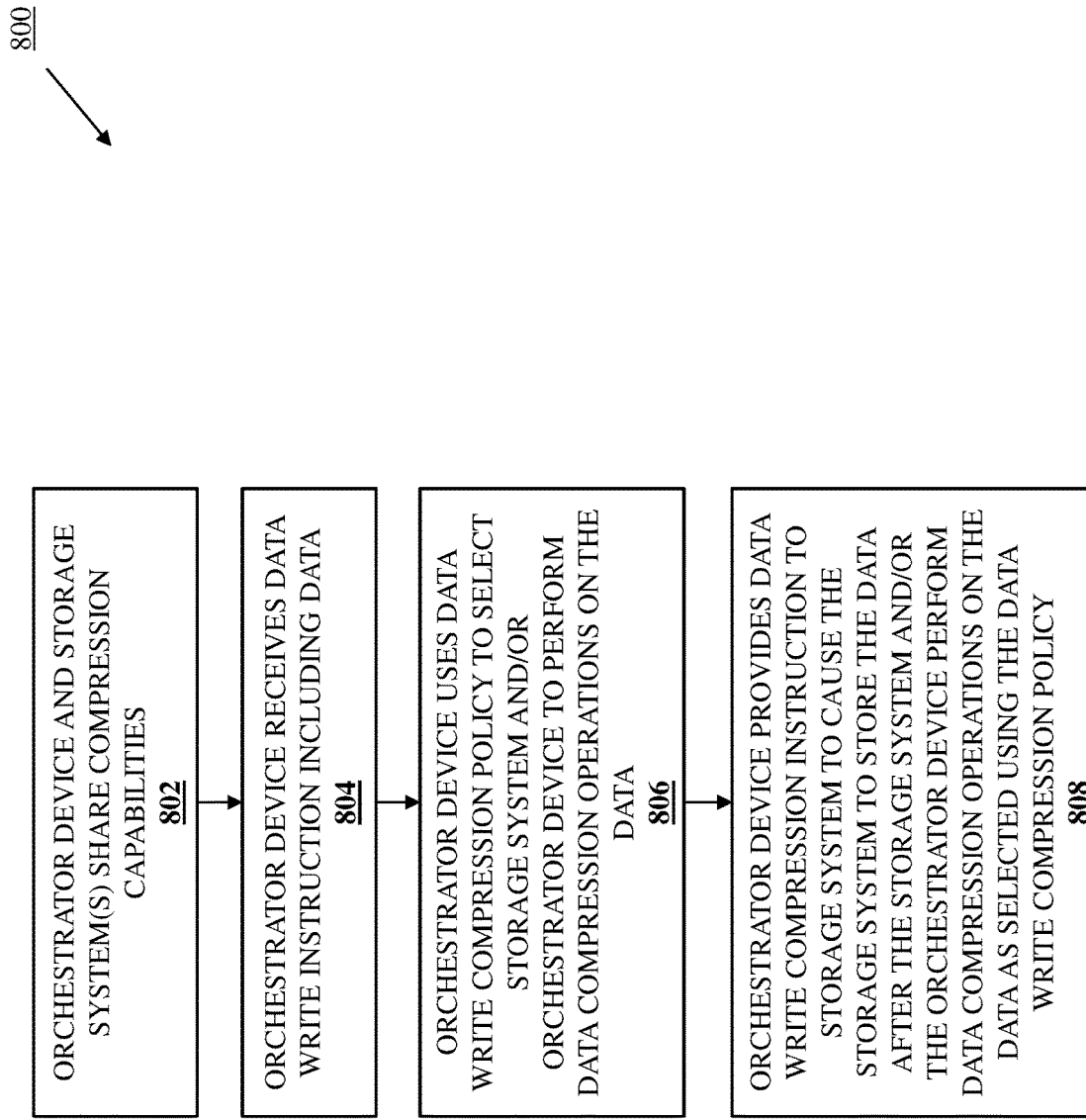

LCS DATA COMPRESSION/DECOMPRESSION SYSTEM

BACKGROUND

The present disclosure relates generally to information handling systems, and more particularly to compressing and decompressing data for Logically Composed Systems (LCSs) that are provided using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, LCSs are often provided using Bare Metal Server (BMS) systems or other resource systems known in the art, with resource devices included within and/or outside of those resource systems (e.g., processing devices and memory devices on a motherboard in the BMS system used to provide an Operating System (OS) for the LCS, storage devices, networking devices, etc.) used to perform the functionality for the LCSs, and often dynamically changing over the time period in which the LCS is provided. Furthermore, orchestrator devices in the BMS systems may orchestrate the provisioning of those LCSs while also including resource devices that may be utilized to provide the functionality of those LCSs. As such, LCSs are disaggregated systems and their associated functionality may be enabled from a variety of different sources and locations (e.g., from resource devices within the BMS system discussed above, resource devices included on the orchestrator device in the BMS system discussed above, resource devices outside the BMS system discussed above, etc.), and the inventors of the present disclosure have recognized that such multi-source/multi-location functionality availability presents opportunities for efficiency improvements.

For example, conventional systems like the server devices discussed above sometimes operate to store data in network-attached storage systems, with the server devices transmitting data to the network-attached storage system as part of a write operation, and the network-attached storage system operating to compress that data to produce compressed data, and then store that compressed data to complete the write operation. Subsequently, the server device may request the data from the network-attached storage system as part of a read operation, and the network-attached storage subsystem will operate to retrieve the compressed data from storage, decompress that data, and then provide that decompressed data to the server device to complete the read operation. However, the inventors of the present disclosure have recognized that the compression/decompression functionality discussed above will be available from multiple sources and locations in the disaggregated systems/LCSs discussed above, and thus conventional performance of the compression and decompression functionality during the write operations and/or read operations in the manner discussed above will suffer from inefficiencies in many scenarios if duplicated for LCSs.

Accordingly, it would be desirable to provide an LCS data compression/decompression system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a Logically Composed System (LCS) orchestrator engine that is configured to: receive, from a host operating system, a read instruction to perform a read operation on data that is stored in a storage system; retrieve, in response to receiving the read instruction, a data read decompression policy; select, using the data read decompression policy, one of the storage system and the LCS orchestrator engine to perform data decompression operations on the data; and provide, to the storage system via a network, a data read decompression instruction that is configured to cause the storage system to provide the data to the LCS orchestrator engine such that the LCS orchestrator engine provides the data to the host operation system after the one of the storage system and the LCS orchestrator device selected using the data read decompression policy performs the data decompression operations on the data.

BRIEF DESCRIPTION OF THE DRAWINGS

FIG. 8 is a flow chart illustrating an embodiment of a method for compressing data for an LCS.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
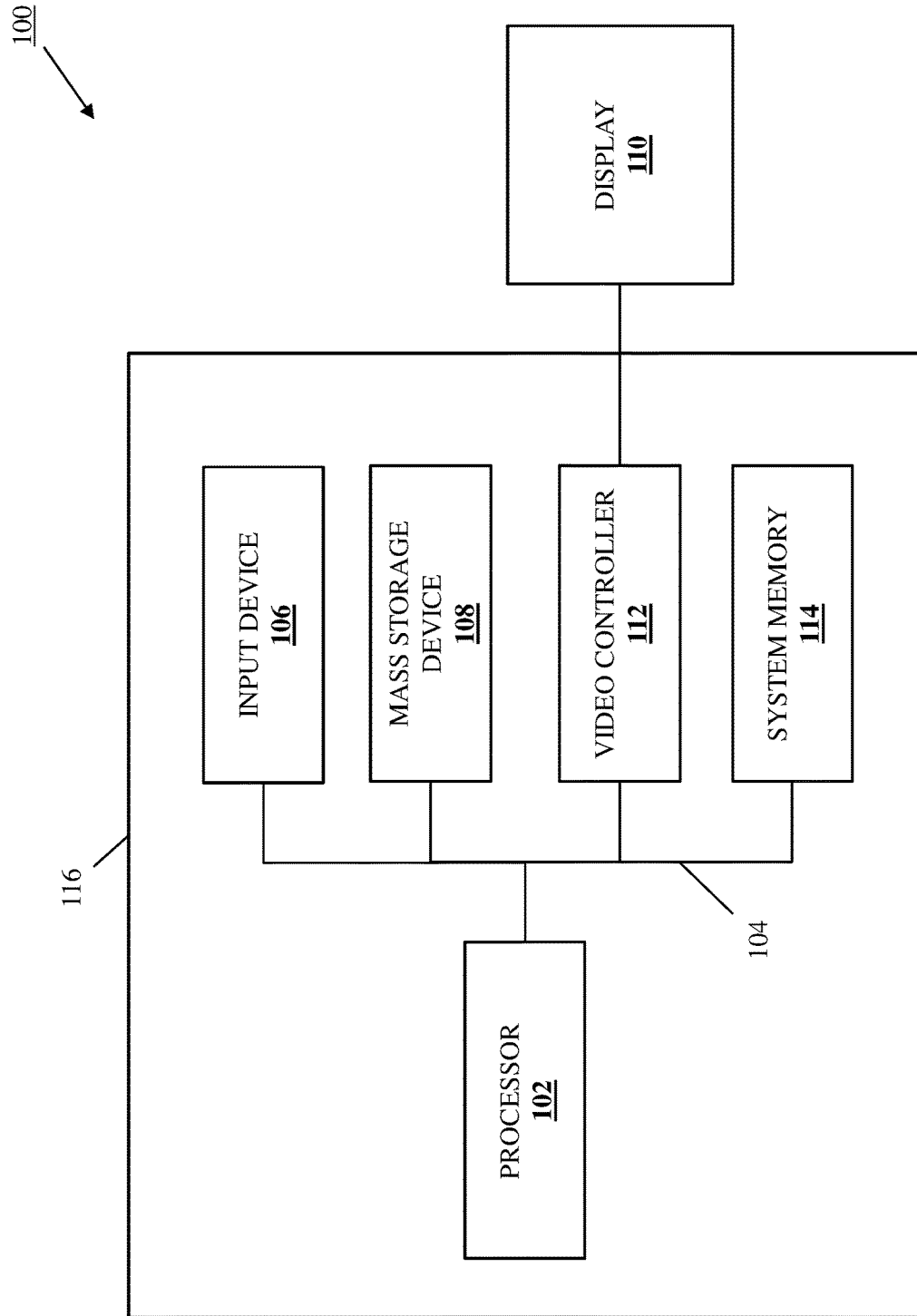
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) data compression/decompression systems and methods of the present disclosure may be utilized with Logically Composed Systems (LCSs), which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
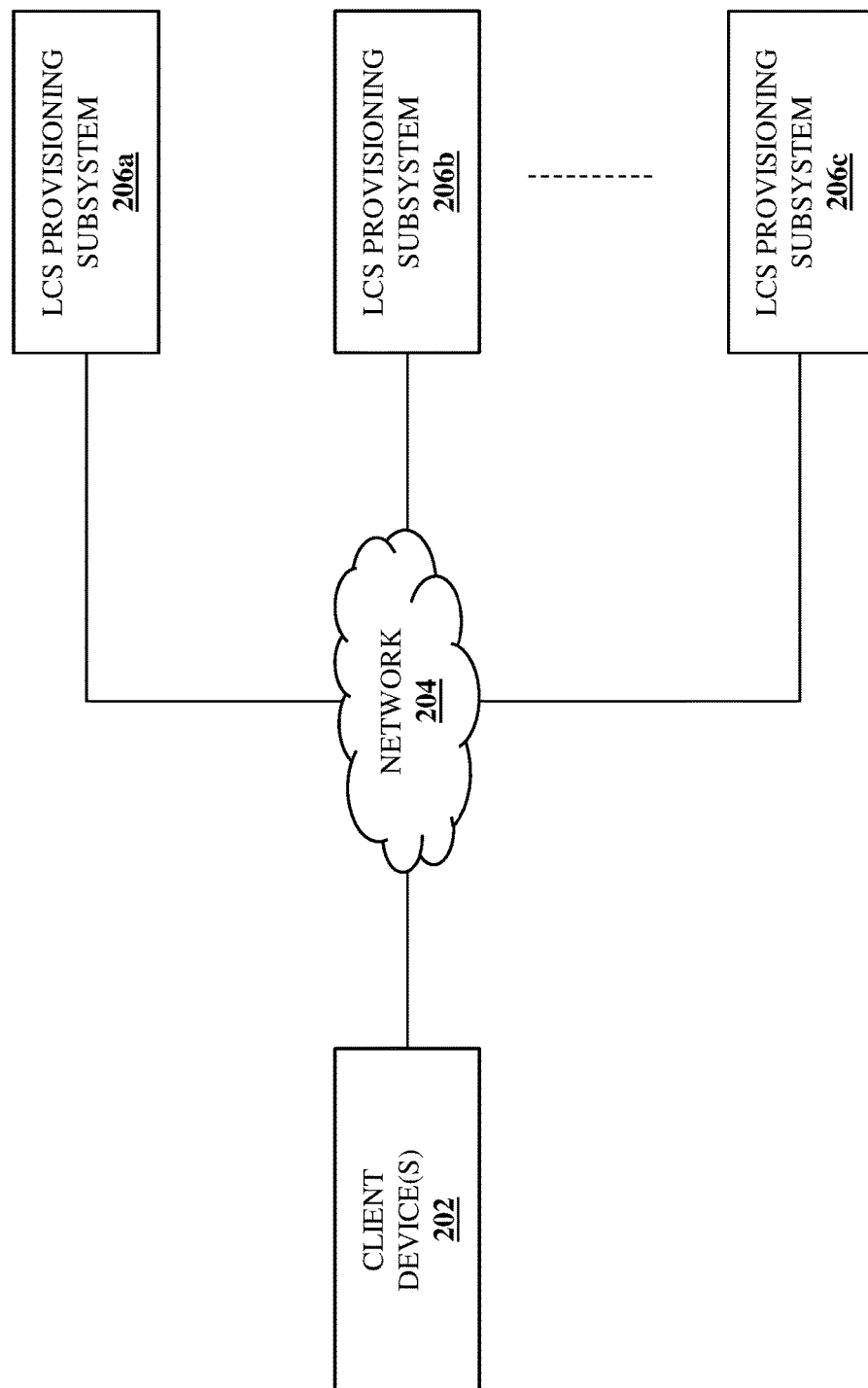
FIG. 2 is a schematic view illustrating an embodiment of an LCS provisioning system.

With reference to FIG. 2, an embodiment of a LCS provisioning system 200 is illustrated that may be utilized with the LCS data compression/decompression systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
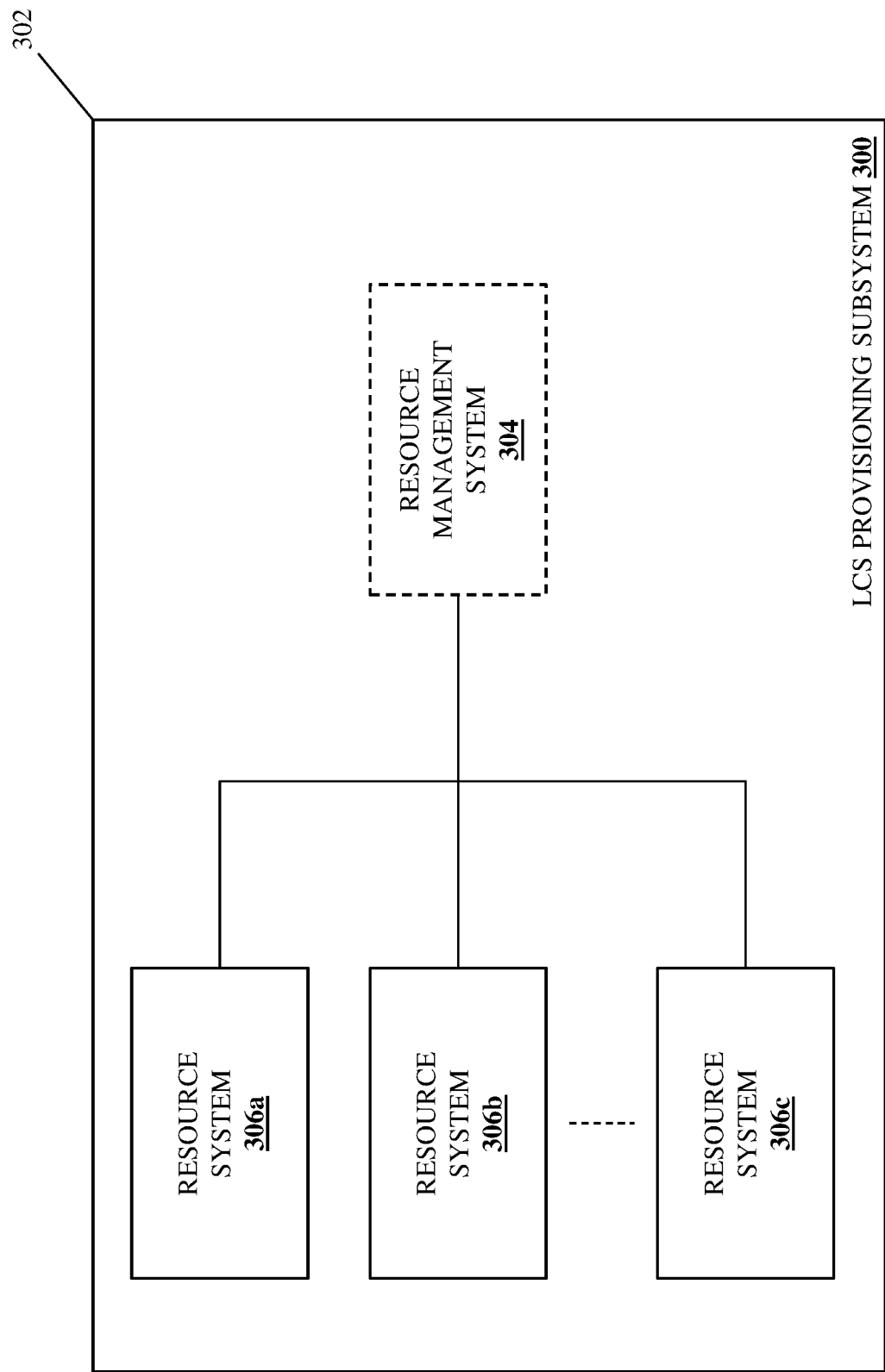
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein. However, while described as being provided by an SCP device or DPU device, one of skill in the art in possession of the present disclosure will appreciate how the orchestrator device of the present disclosure may also be provided by other devices that have been configured to perform the orchestrator functionality described below while remaining within the scope of the present disclosure as well.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
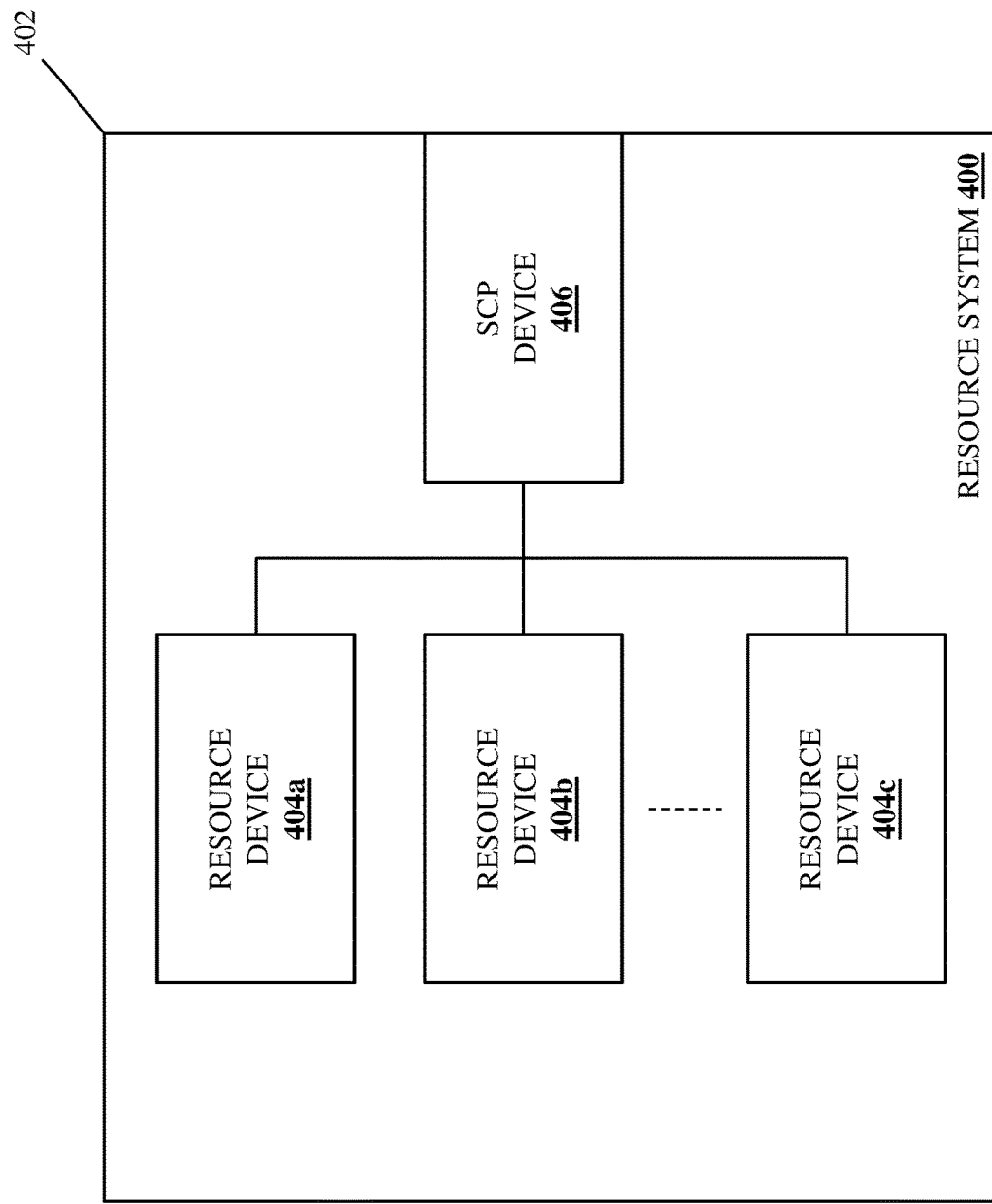
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (TO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
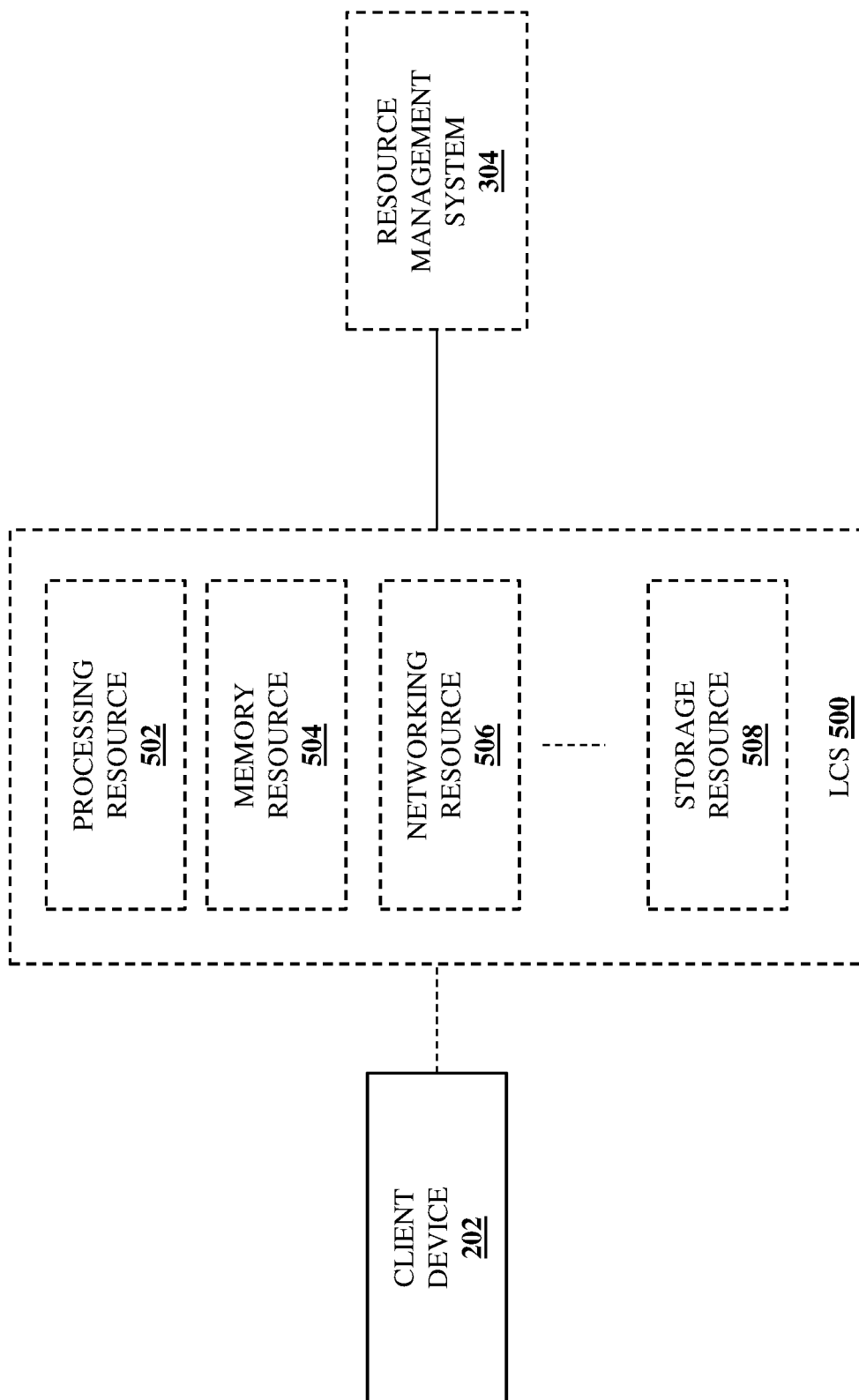
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that the user would like to perform (e.g., "I need an LCS with 10 gigahertz (GHz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 GHz of processing power and 8 GB of memory capacity for an application with 20 TB of high-performance protected object storage for use with a hospital-compliant network, the processing resources 502 in the LCS 500 may be configured to utilize 10 GHz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508 if needed.

Figure 6:
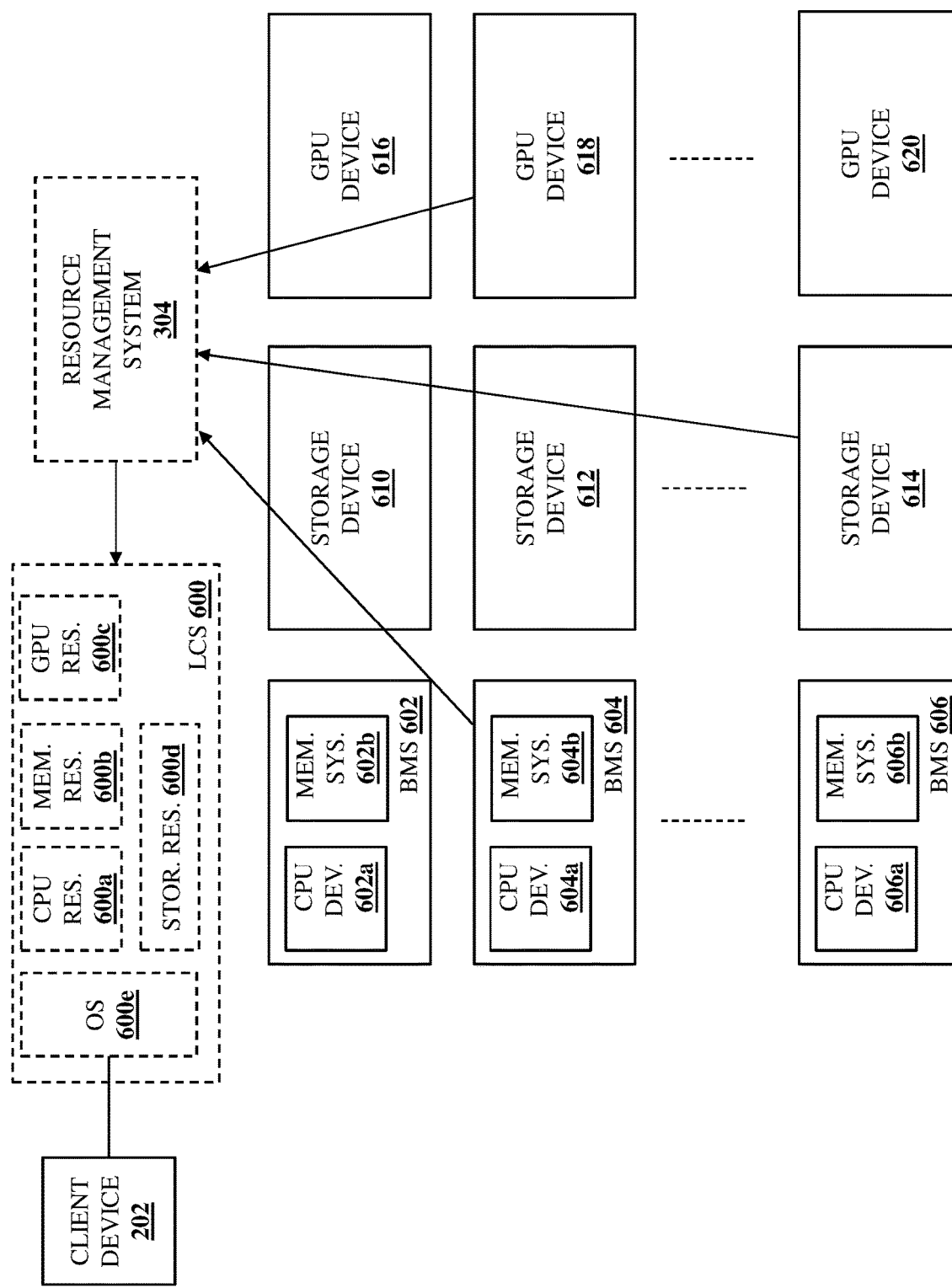
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7A:
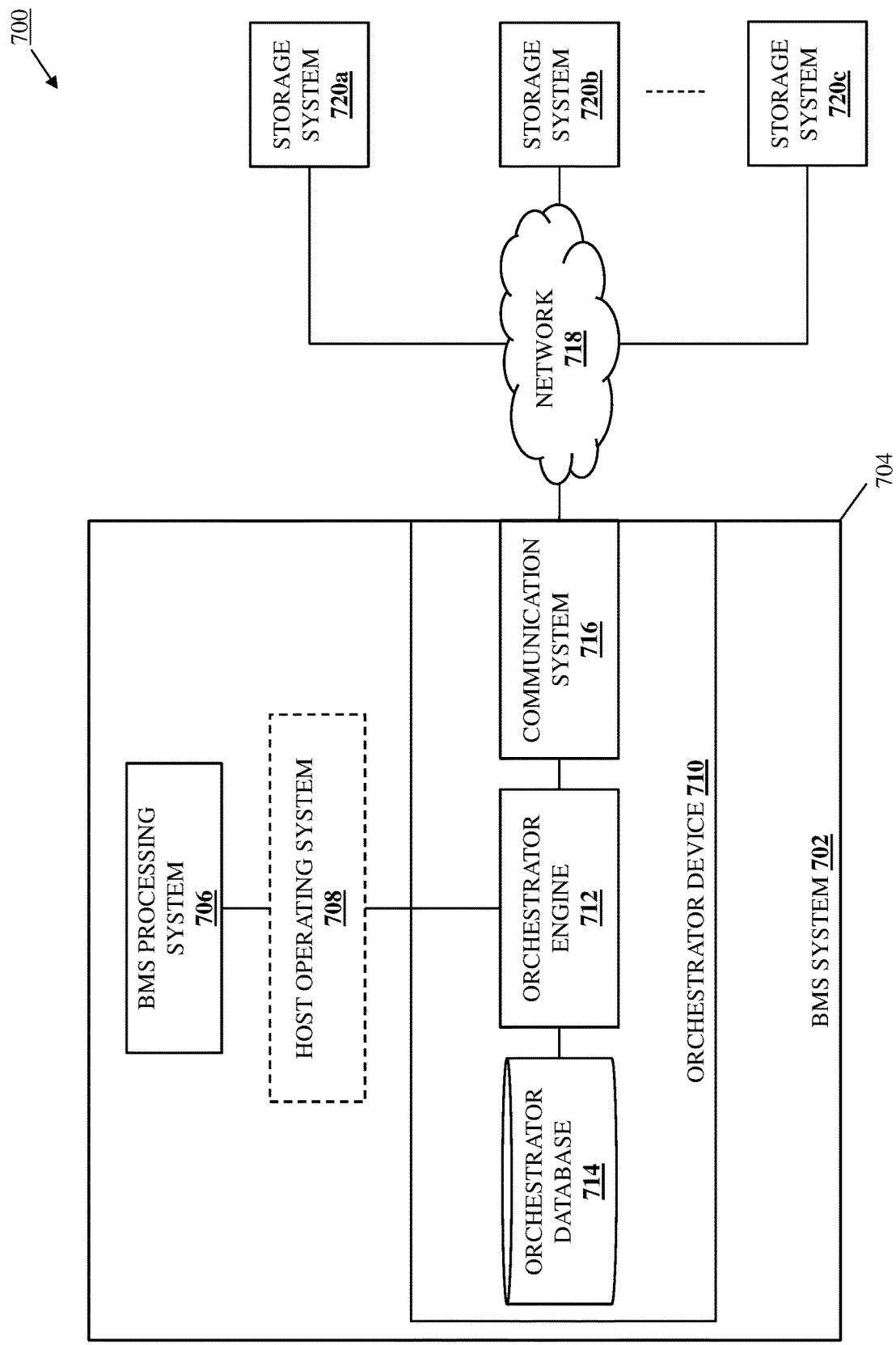
FIG. 7A is a schematic view illustrating an embodiment of an LCS data compression/decompression system provided according to the teachings of the present disclosure.

Referring now to FIG. 7A, an embodiment of an LCS data compression/decompression system 700 provided according to the teachings of the present disclosure is illustrated. The LCS data compression/decompression system 700 includes a resource system that, in the illustrated embodiment, is provided by a BMS system 702 that may be provided by any of the resource systems 304a-304c and 400 and/or the BMS systems 602-604 discussed above. In the illustrated embodiment, the BMS system 702 includes a chassis 704 that houses the components of the BMS system 702, only some of which are illustrated and discussed below. For example, the chassis 704 may house a BMS processing system 706 (e.g., the processor 102 discussed above with reference to FIG. 1, a Central Processing Unit (CPU), etc.) and a memory system (not illustrated, but which may include the memory 114 discussed above with reference to FIG. 1) that is coupled to the BMS processing system 706 and that includes instructions that, when executed by the BMS processing system 706, cause the BMS processing system 706 to provide a host operating system 708 for an LCS that is configured to perform the functionality of the host operating systems discussed below.

The chassis 704 may also house an orchestrator device 710 that may be provided by the SCP devices, DPU devices, and/or other orchestrator devices discussed above. In the illustrated embodiment, the orchestrator device 710 may include an orchestrator processing system (not illustrated, but which may include the processor 102 discussed above with reference to FIG. 1) and an orchestrator memory system (not illustrated, but which may include the memory 114 discussed above with reference to FIG. 1) that is coupled to the orchestrator processing system and that includes instructions that, when executed by the orchestrator processing system, cause the orchestrator processing system to provide an orchestrator engine 712 that is configured to perform the functionality of the orchestrator engines and/or orchestrator devices discussed below.

The orchestrator device 710 may also include a storage system (not illustrated, but which may include the storage 108 discussed above with reference to FIG. 1) that is coupled to the orchestrator engine 712 (e.g., via a coupling between the storage system and the orchestrator processing system) and that includes an orchestrator database 714 that is configured to store any of the information utilized by the orchestrator engine 712 discussed below. The orchestrator device 710 may also house a communication system 716 that is coupled to the orchestrator engine 712 (e.g., via a coupling between the communication system 716 and the orchestrator processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure.

In the illustrated embodiment, the communication system 716 in the orchestrator device 710 is coupled to a network 718 that may be provided by a Local Area Network (LAN), the Internet, combinations thereof, and/or other networks that would be apparent to one of skill in the art in possession of the present disclosure. Furthermore, a plurality of storage systems 720a, 720b, and up to 720c are coupled to the network 718 in a manner that allows the orchestrator device 710 to store and retrieve data from those storage systems 720a-720c via the network 718. In an embodiment, any or all of the storage systems 720a-720c may be provided by the IHS 100 discussed above with reference to FIG. 1, and/or may include some or all of the components of the IHS 100, and specific examples may be provided by server device(s) with storage resources. However, while described as server devices with storage resources, one of skill in the art in possession of the present disclosure will appreciate how the storage systems 720a-720c may be provided by a variety of other storage systems and/or components while remaining within the scope of the present disclosure as well. As discussed below, in some embodiments one or more of the storage systems 720a-720c may be configured to perform data compression and/or decompression functionality, while in other embodiments, one or more of the storage systems 720a-720c may not be configured to perform data compression and/or decompression functionality. Furthermore, while the storage systems 720a-720c are illustrated as network-connected storage systems (i.e., from the point of view of the orchestrator device 710), other embodiments may include at least one of the storage systems 720a-720c included in the chassis 704 of the BMS system 702.

As discussed above, the components illustrated in FIG. 7A may be utilized to provide an LCS for a client device. For example, the BMS processing system 706 may operate as discussed above to provide the host operating system 708 for an LCS that was composed by the resource management system 304 discussed above and provided with the assistance of the orchestrator device 710. Furthermore, as also discussed above, resource devices included within and/or outside the chassis 704 of the BMS system 702 may be utilized by the orchestrator device 710 to provide the LCS, with the storage systems 720a-720c providing just a few examples of network-connected resource devices that are being utilized to provide the LCS. As such, while a client device and LCS are not explicitly illustrated in the examples provided below, one of skill in the art in possession of the present disclosure will appreciate how the data write operations and data read operations may be performed at the instruction of the host operating system 708 during the operation of an LCS that utilizes the host operating system 708, the orchestrator device 710, and the storage systems 720a-720c.

As discussed below, the orchestrator device 710 may be configured to perform data compression and/or decompression functionality. For example, with reference to FIG. 7B, the orchestrator engine 712 discussed above with reference to FIG. 7A may provide an orchestrator operating system 722 for the orchestrator device 710. In the illustrated embodiment, the orchestrator operating system 722 provides an emulated storage device 722a that is described as being provided by an emulated Non-Volatile Memory express (NVMe) storage device in the specific examples provided below, although one of skill in the art in possession of the present disclosure will appreciate how other storage device types may be emulated by the orchestrator operating system 7212 while remaining within the scope of the present disclosure as well. As such, the orchestrator operating system 722 may be configured to present the emulated storage device 722a to one or more storage drivers 708a provided by the host operating system 708, which may allow container(s), application(s), and/or virtual machine(s) provided by the host operating system 708 to utilize the emulated storage device 722a via the storage driver(s) 708a as if it were one or more physical storage devices (i.e., the write and read data as described below).

Figure 7B:
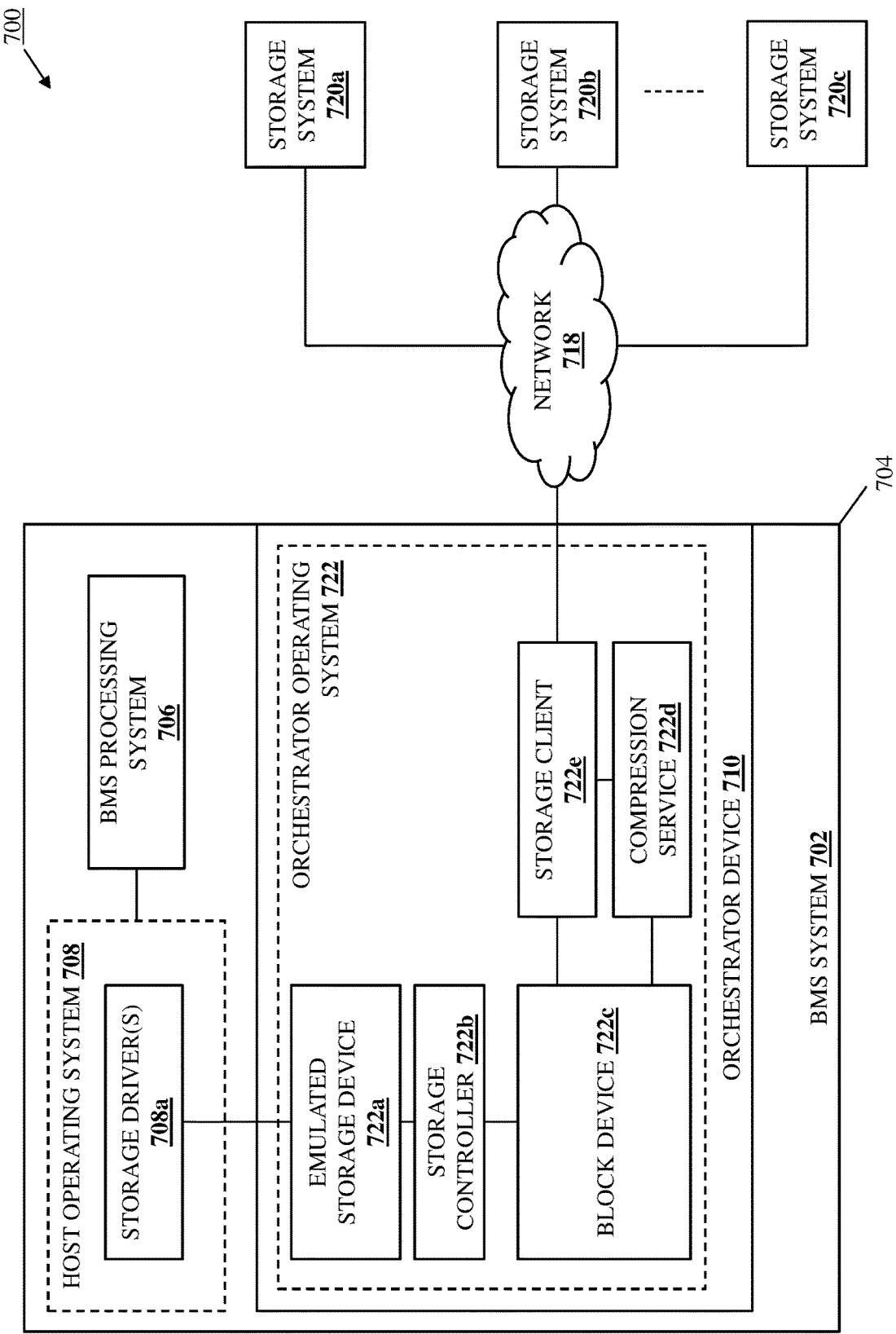
FIG. 7B is a schematic view illustrating an embodiment of the LCS data compression/decompression system provided of FIG. 7A.

As also illustrated in FIG. 7B, the orchestrator operating system 722 may also provide a storage controller 722b for the emulated storage device 722a that may be configured to perform any of the storage control operations discussed below for the emulated storage device 722a. Furthermore, the orchestrator operating system 722 may also provide a block device 722c that one of skill in the art in possession of the present disclosure will recognize is a storage abstraction that may be presented as a storage disk to the storage systems 720a-720c when sending or receiving data as discussed below. The orchestrator operating system 722 may also provide a compression service 722d that one of skill in the art in possession of the present disclosure will appreciate may be enabled via compression/decompression hardware that is included on the orchestrator device 710. Finally, the orchestrator operating system 722 may also provide a storage client 722e that one of skill in the art in possession of the present disclosure will appreciate is configured to provide the communication with the storage systems 720a-720c discussed below. However, while a specific LCS data compression/decompression system 700 and orchestrator device 710 have been illustrated and described, one of skill in the art in possession of the present disclosure will recognize that the LCS data compression/decompression systems and/or orchestrator devices of the present disclosure may include a variety of components and/or component configurations for providing conventional functionality, as well as the functionality discussed below, while remaining within the scope of the present disclosure as well.

Referring now to FIG. 8, an embodiment of a method 800 for compressing data for a Logically Composed System (LCS) is illustrated. As discussed below, the systems and methods of the present disclosure provide for dynamic, policy-based utilization of compression functionality on an LCS orchestrator device and a storage system used with an LCS in order to perform efficient data compression operations, and may take into account properties of the data, the state of LCS resource devices, and/or other factors in order to perform the efficient data compression operations discussed above while ensuring performance levels for the LCS/LCS resource devices. For example, the LCS data compression system of the present disclosure may include an orchestrator device in a resource system with a host operating system and coupled to a storage system via a network. The orchestrator device receives a write instruction from the host operating system with data provided for storage in the storage system and, in response, retrieves and uses a data write compression policy to select at least one of the storage systems and the orchestrator device to perform data compression operations on the data. The orchestrator device then provides a data write compression instruction to the storage system to cause the storage system to store the data after the at least one of the storage systems and the orchestrator device selected using the data write compression policy performs the data compression operations on the data. As such, the efficiency of data compression in a disaggregated system with a variety of compression resources and locations is improved.

Figure 9A:
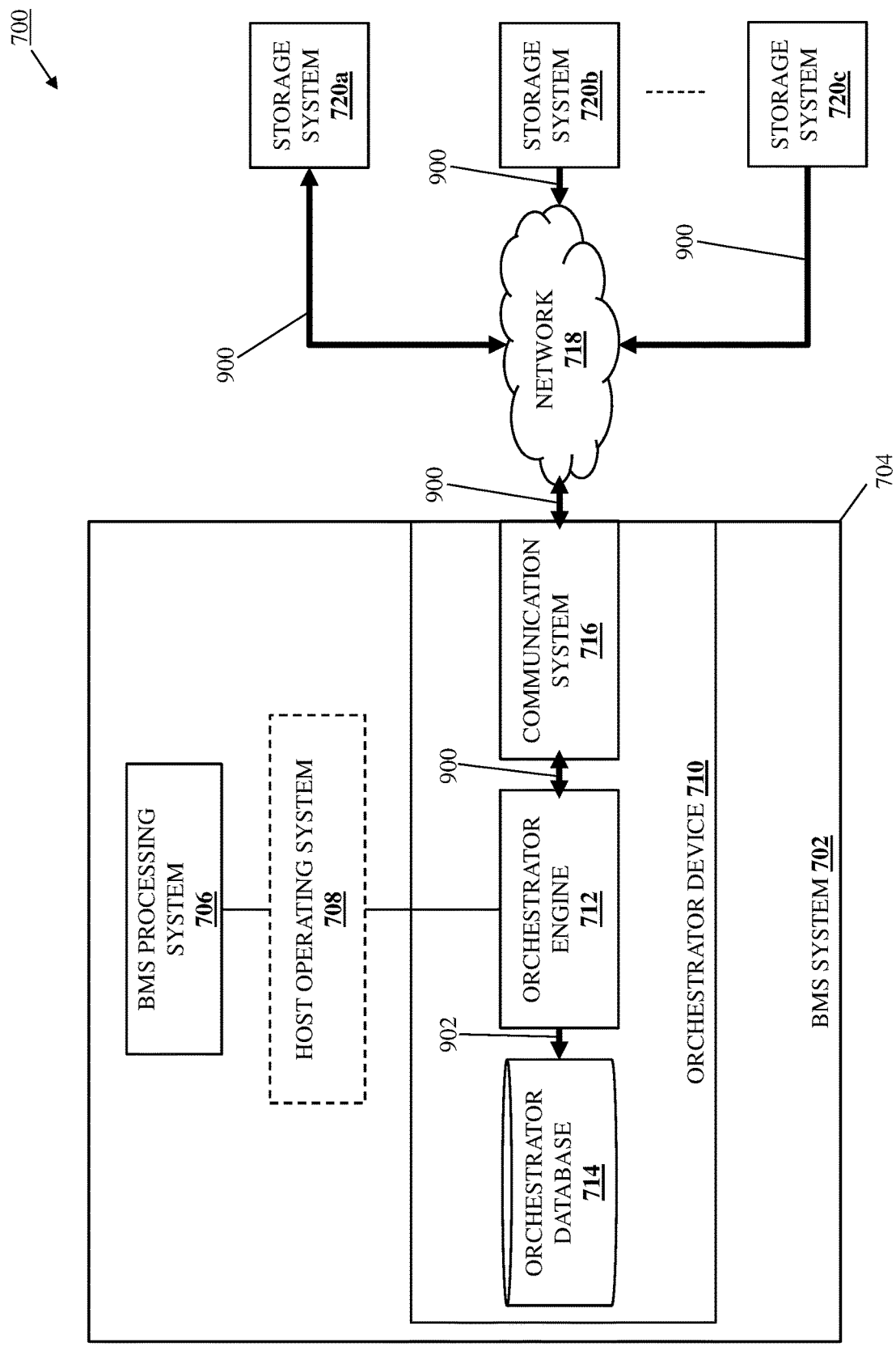
FIG. 9A is a schematic view illustrating an embodiment of the LCS data compression/decompression system of FIG. 7A operating during the method of FIG. 8.

The method 800 begins at block 802 where an orchestrator device and a storage system(s) share compression capabilities. With reference to FIG. 9A, in an embodiment of block 802, the storage systems 720a-720c and the orchestrator engine 712 in the orchestrator device 710 may perform compression capability exchange operations 900 that may include the orchestrator engine 712 transmitting its compression capabilities via the communication system 716 and through the network 718 to each of the storage systems 720a-720c, and each of the storage systems 720a-720c transmitting their respective compression capabilities through the network 718 and to the orchestrator engine 712 via its communication system 716. As illustrated in FIG. 9A, in response to receiving the compression capabilities from the storage systems 720a-720c, the orchestrator engine 712 may perform compression capability storage operations 902 that include storage those compression capabilities in the orchestrator database 714.

In an embodiment, the compression capabilities transmitted during the compression capability exchange operations 900 may include an identification of whether compression functionality is available, a type of compression capability that is available (e.g., a compression algorithm that will be used in compression operations), any of the data write compression polic(ies) discussed below, a protocol format for generating the compression metadata discussed below, and/or any other compression capability information that one of skill in the art in possession of the present disclosure would recognize as allowing for the functionality discussed below. In some embodiments of block 802, the compression capability exchange operations 900 may include, or be followed by, compression negotiation operations between the storage systems 720a-720c and the orchestrator engine 712 in the orchestrator device 710 in order to, for example, negotiate the use of compatible compression functionality by the orchestrator engine 712 and any of the storage systems 720a-720c. However, while the exchange of compression capability information and the negotiation of compression functionality has been described, one of skill in the art in possession of the present disclosure will recognize that other information may be exchanged and/or other functionality negotiated in order to provide the functionality discussed below while remaining within the scope of the present disclosure as well.

Figure 9B:
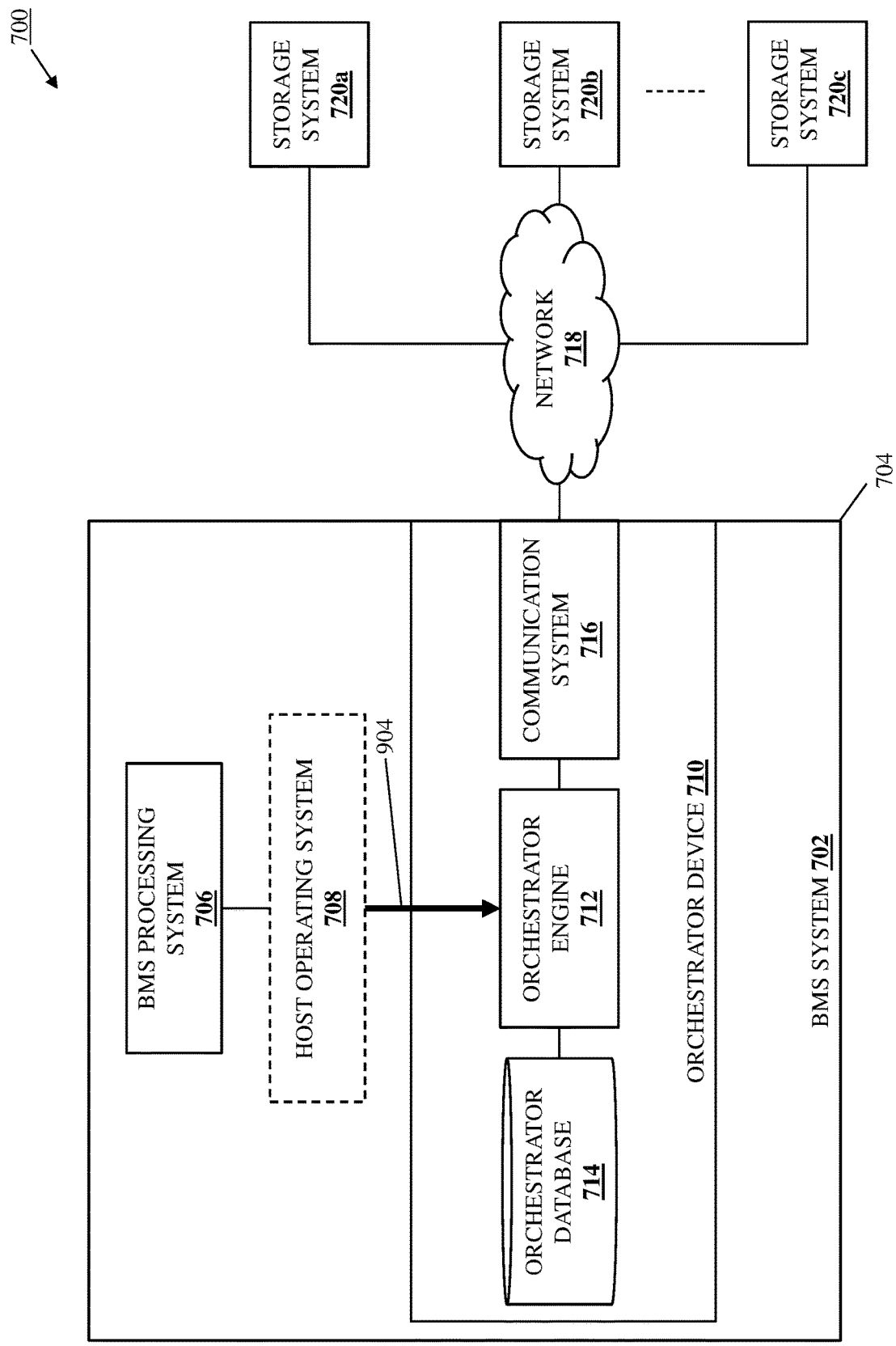
FIG. 9B is a schematic view illustrating an embodiment of the LCS data compression/decompression system of FIG. 7A operating during the method of FIG. 8.

The method 800 then proceeds to block 804 where the orchestrator device receives a data write instruction including data for storage. With reference to FIG. 9B, in an embodiment of block 804, the orchestrator engine 712 in the orchestrator device 710 may perform data write instruction receiving operations 904 that include receiving a data write instruction from the host operating system 708. For example, the host operating system 708 provided for the LCS discussed above may receive an instruction from a user (e.g., via a container, application, and/or virtual machine provided by the host operating system 708 as discussed above) to store data and, in response, the host operating system 708 may generate and transmit a data write instruction that includes that data to the orchestrator engine 712 in the orchestrator device 710. As will be appreciated by one of skill in the art in possession of the present disclosure, the data provided with the data write instruction at block 804 may be uncompressed data, and may include any of a variety of end-to-end data protection information that would be apparent to one of skill in the art in possession of the present disclosure.

To provide a specific example in which the emulated storage device 722a is an emulated NVMe storage device 722a, at block 804 a host NVMe initiator provided by the host operating system 708 may provide the data write instruction in an NVMe storage device submission queue of the emulated NVMe storage device 722a, and then may ring a doorbell for the emulated NVMe storage device 722a. In response, the emulated NVMe storage device 722a/storage controller 722b will read the NVMe storage device submission queue to retrieve the data write instruction. However, while a specific example is provided, one of skill in the art in possession of the present disclosure will appreciate that the orchestrator engine 712 in the orchestrator device 710 may receive the data write instruction in a variety of manners that will fall within the scope of the present disclosure as well.

Figure 9C:
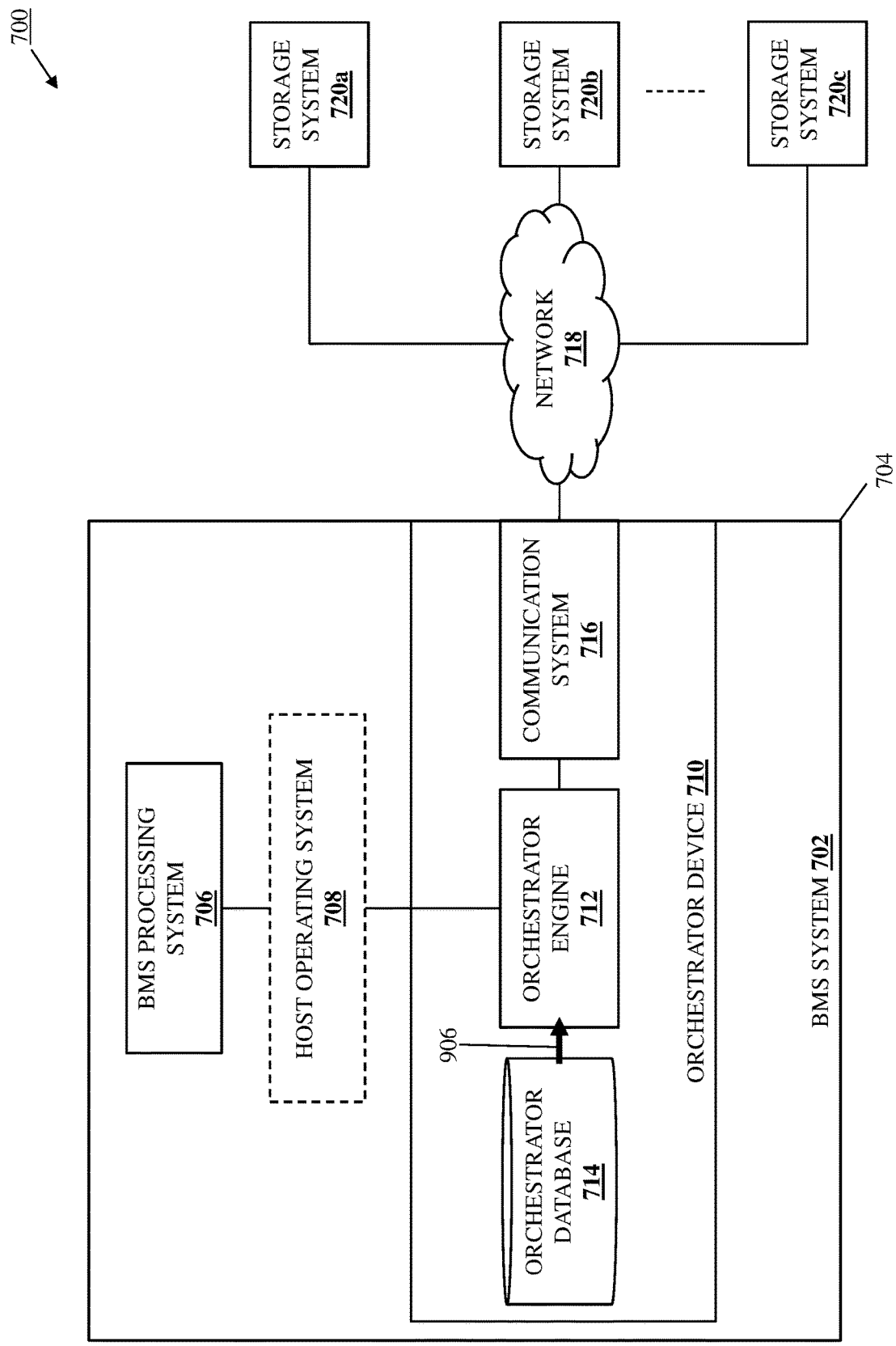
FIG. 9C is a schematic view illustrating an embodiment of the LCS data compression/decompression system of FIG. 7A operating during the method of FIG. 8.

The method 800 then proceeds to block 806 where the orchestrator device uses a data write compression policy to select the storage system and/or the orchestrator device to perform data compression operations on the data. With reference to FIG. 9C, in an embodiment of block 806, the orchestrator engine 712 in the orchestrator device 710 may perform data write compression policy retrieval operations 906 that include accessing a data write compression policy that is stored in the orchestrator database 714. As will be appreciated by one of skill in the art in possession of the present disclosure, the data write compression policies described herein may be provided in orchestrator devices in resource systems (e.g., in the orchestrator device 710 in the BMS system 702 in FIG. 9C) by an administrator of the LCS provisioning system discussed above, and may define how data compression should be performed for any LCS provided using that orchestrator device and the disaggregated resource devices discussed above. As such, the data write compression policy retrieved at block 806 may have been generated and stored in the orchestrator database 714 prior to the method 800, and many include any of a variety of policy details that provide for the data compression functionality described below.

As will be appreciated by one of skill in the art in possession of the present disclosure, the data write compression policy may include any of a variety of policy details that define when, where, and how data will be compressed as part of a data write operation. For example, a relatively simple data write compression policy may define a data size under which data will be transmitted for storage in a storage system without performing data compression operations on that data, and over which data compression operations will be performed on that data prior to transmitting that data for storage in the storage system. As such, the data write compression policy may consider data transfer bandwidth savings (e.g., data transfer bandwidth savings realized via the transmission of compressed data vs. decompressed data) when determining how, when, and where to perform data compression operations.

In another example, another relatively simple data write compression policy may define an orchestrator device processing bandwidth under which data will be transmitted for storage in a storage system without performing data compression operations on that data, and over which data compression operations will be performed on that data prior to transmitting that data for storage in the storage system. In another example, another relatively simple data write compression policy may define a storage system processing bandwidth over which data will be transmitted for storage in a storage system without performing data compression operations on that data, and under which data compression operations will be performed on that data prior to transmitting that data for storage in the storage system. For example, the orchestrator device may be configured to receive or retrieve storage system processing system telemetry data or other information that is indicative of the storage system processing bandwidth discussed above, and utilize that with the data write compression policy discussed above. As such, the data write compression policy may consider CPU utilization (e.g., current CPU utilization in either or both of the orchestrator device and the storage system) when determining how, when, and where to perform data compression operations.

In another example, another relatively simple data write compression policy may define a network bandwidth over which data will be transmitted for storage in a storage system without performing data compression operations on that data, and under which data compression operations will be performed on that data prior to transmitting that data for storage in the storage system. For example, the orchestrator device may be configured to identify a network bandwidth based on an amount of data traffic that is being transmitted via its communication system 716 (e.g., via a NIC port that is coupled to the network 718). As such, the data write compression policy may consider data transfer bandwidth (e.g., data transfer bandwidth currently available in the network) when determining how, when, and where to perform data compression operations.

Furthermore, one of skill in the art in possession of the present disclosure will appreciate how the relatively simple data write compression policies discussed above may be combined to generate relatively more complex data write compression policies that consider data size, orchestrator processing bandwidth, storage system processing bandwidth, network bandwidth, as well as any other factors that would be apparent to one of skill in the art in possession of the present disclosure. For example, at block 806 the orchestrator engine 712 in the orchestrator device 710 may select the storage system 720a and/or the orchestrator device 710 to perform data compression operations based on a data block/shard size, processing statistics generated by the storage system 720a and/or orchestrator device 710, network statistics, other information that may be indicative of a network bottleneck, etc. However, while a few specific data write compression policies have been described, one of skill in the art in possession of the present disclosure will appreciate how a variety of data write compression policies of varying complexity may define when, where, and how compression should be performed prior to storing data in a storage system while remaining within the scope of the present disclosure as well.

One of skill in the art in possession of the present disclosure will recognize that the orchestrator engine 712 in the orchestrator device 710 may have access to any of a variety of information about the operation of the LCS (and the resource devices used to provide that LCS) in order to utilize the data write compression policy to select a storage system and/or the orchestrator device to perform data compression operations on the data. For example, in order to determine the orchestrator device processing bandwidth discussed above, the orchestrator engine 712 may have access to orchestrator processing system telemetry data and/or other operating information. Similarly, in order to determine the storage system processing bandwidth discussed above, the orchestrator engine 712 may have access to storage system processing system telemetry data and/or other operating information via the network 718. Similarly as well, in order to determine the network bandwidth discussed above, the orchestrator engine 712 may have access to network operating information via its communication system 716, with the network operating information including directly measured operating information (e.g., via its NIC port as described above) or indirectly measured operating information (e.g., provided via directly measured operation information that is indicative of the indirectly measured operating information).

As such, at block 806, the orchestrator engine 712 in the orchestrator device 710 may use the data write compression policy and any of the information discussed above in order to select at least one of the storage systems 720a-720c and the orchestrator device 710 to perform data compression operations on the data. In some of the specific examples provided below, the orchestrator engine 712 in the orchestrator device 710 selects the storage system 720a for performing compression operations and/or storing the data, but one of skill in the art in possession of the present disclosure will appreciate how the other storage systems 720b-720c may be selected to perform the compression operations and/or store the data while remaining within the scope of the present disclosure as well. For example, some embodiments of block 806 may include the orchestrator engine 712 in the orchestrator device 710 using the data write compression policy and any of the information discussed above in order to select the orchestrator device 710 to perform data compression operations on the data. In another example, some embodiments of block 806 may include the orchestrator engine 712 in the orchestrator device 710 using the data write compression policy and any of the information discussed above in order to select the storage system 720a to perform data compression operations on the data. In yet another example, some embodiments of block 806 may include the orchestrator engine 712 in the orchestrator device 710 using the data write compression policy and any of the information discussed above in order to select both the storage system 720a and the orchestrator device 710 to perform data compression operations on the data.

In embodiments in which the orchestrator engine 712 in the orchestrator device 710 selects the orchestrator device 710 to perform data compression operations on the data, the orchestrator engine 712 may operate to compress the data received from the host operating system 708 to provide compressed data. Continuing with the specific example in which the emulated storage device 722a is an emulated NVMe storage device 722a, at block 806 the NVMe storage device 722a/storage controller 722b may provide the data in the data write instruction to the compression service 722d in order to compress that data to provide the compressed data. Following the compression of the data to provide the compressed data, the orchestrator engine 712 in the orchestrator device 710 may generate compression metadata that may include any of a variety of details about the compression of that data, and provide the compressed data in a data write compression instruction. As discussed in further detail below, the compression metadata may include any details about the compression of data that would be required by another device or system that did not perform that compression in order to decompress that data, and allows the decompression operations discussed below to be performed by any decompression-enabled resource device that provides the disaggregated system/LCS regardless of where the compression operations were performed.

For example, the compression metadata generated as discussed above may identify a compression algorithm that was used to compress the data, a compression ratio of the decompressed data to the compressed data, a size of the decompressed data, a size of the compressed data, a checksum for the compressed data, and/or any other compression metadata that one of skill in the art in possession of the present disclosure would recognize as providing for the decompression functionality described below. Furthermore, one of skill in the art in possession of the present disclosure will appreciate how if the orchestrator engine 712 in the orchestrator device 710 selects both the storage system 720a and the orchestrator device 710 to perform data compression operations on the data, the orchestrator engine 712 may operate to compress the data received from the host operating system 708 in the data write instruction to provide compressed data, generate compression metadata that includes the details of the compression of that data, and provide the compressed data in a data write compression instruction similarly as discussed above. In embodiments in which the orchestrator engine 712 in the orchestrator device 710 selects the storage system 720a to perform data compression operations on the data, the orchestrator engine 712 may operate to provide the uncompressed data in a data write compression instruction.

Figure 9D:
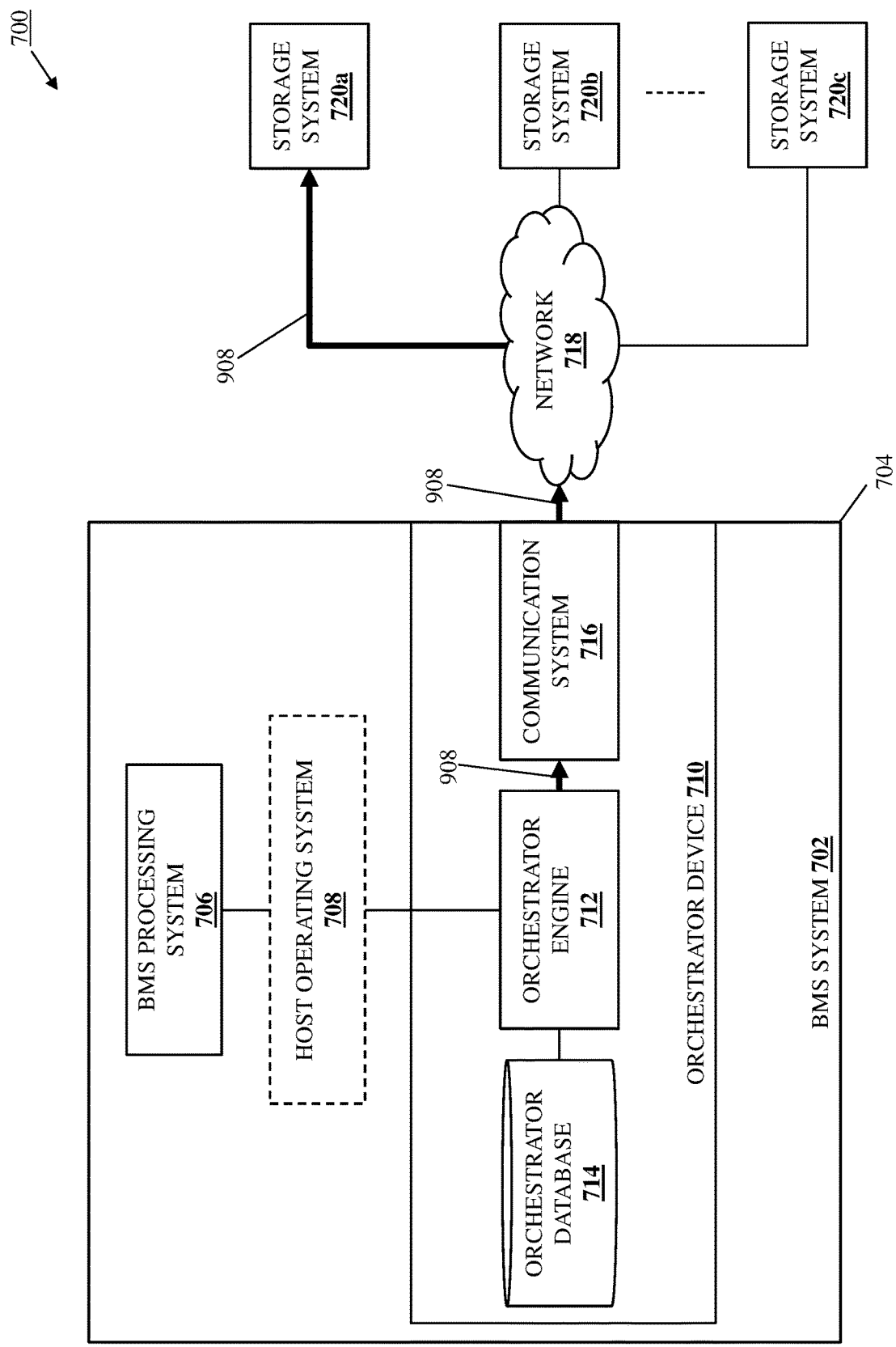
FIG. 9D is a schematic view illustrating an embodiment of the LCS data compression/decompression system of FIG. 7A operating during the method of FIG. 8.

The method 800 then proceeds to block 808 where the orchestrator device provides a data write compression instruction to the storage system to cause the storage system to store the data after the storage system and/or the orchestrator device selected using the data write compression policy perform data compression operations on the data. With reference to FIG. 9D, in an embodiment of block 808, the orchestrator engine 712 in the orchestrator device 710 may perform data write compression instruction transmission operations 908 that include transmitting the data write compression instruction via its communication system 716 and through the network 718 to the storage system 720a.

Continuing with the example above in which the orchestrator device 710 performed data compression operations on the data received from the host operating system 708, the data write compression instruction may include the compressed data, the compression metadata, and/or any other information that would be apparent to one of skill in the art in possession of the present disclosure as allowing for the functionality described below. In an embodiment, in response to receiving the data write compression instruction, the storage system 720a may store the compressed data and its compression metadata in one or more storage devices included in the storage system 720a.

Continuing with the example above in which the storage system 720a was selected to perform data compression operations on the data received from the host operating system 708, the data write compression instruction may include the uncompressed data and/or any other information that would be apparent to one of skill in the art in possession of the present disclosure as allowing for the functionality described below. In an embodiment, in response to receiving the data write compression instruction, the storage system 720a may compress the decompressed data to provide compressed data, generate compression metadata that includes the details of the compression of that data substantially similarly as discussed above, and store the compressed data and its compression metadata in one or more storage devices included in the storage system 720a.

Continuing with the example above in which both the orchestrator device 710 and the storage system 720a were selected to perform data compression operations on the data received from the host operating system 708, the data write compression instruction may include the compressed data (which was compressed by the orchestrator device 710), the compression metadata, and/or any other information that would be apparent to one of skill in the art in possession of the present disclosure as allowing for the functionality described below. In an embodiment, in response to receiving the data write compression instruction, the storage system 720a may decompress the compressed data using the compression metadata in order to provide uncompressed data, and then recompress the uncompressed data to provide compressed data, generate the compression metadata that includes the details of the compression of that data as discussed above, and store the compressed data and its compression metadata in one or more storage devices included in the storage system 720a. For example, the selection of both the orchestrator device 710 and the storage system 720a to perform data compression operations on the data may provide for relatively "lightweight" or "simple" compression operation on the data by the orchestrator device 710 prior to transmission to the storage system 720a, followed by relatively "heavy" or "complex" compression operation by the storage system 720a (subsequent to decompressing the "lightweight" or "simple" compressed data received from the orchestrator device 710) prior to storing the "heavy" or "complex" compressed data in the storage system 720a.

In yet another example, the selection of both the orchestrator device 710 and the storage system 720a to perform data compression operations on the data may result in the data be divided into data subsets (e.g., equal size data subsets, unequal size data subsets, etc.), and having the orchestrator device 710 compress one or more of those data subsets and transmit them along with the uncompressed data subset(s) to the storage system 720a, and then having the storage system 720a compress the uncompressed data subset(s) before storing all the compressed data subsets in its storage device(s). In yet another example, the selection of both the orchestrator device 710 and the storage system 720a to perform data compression operations on the data may result in "layered" compression operations in which the orchestrator device 710 performs a first layer of compression on the data to provide first compressed data, and the storage system 720a performs a second layer of compression on the first compressed data to provide second compressed data. However, while several different combined storage system/orchestrator device compression operations have been described, one of skill in the art in possession of the present disclosure will recognize how the orchestrator device and a storage system may both perform compression operations on common data in a variety of manners that will fall within the scope of the present disclosure as well.

Continuing with the specific example in which the emulated storage device 722a is an emulated NVMe storage device 722a, at block 808 and in response to the storage of the data in any of the different manners discussed above, the storage controller 722b may provide a completion message in an NVMe storage device completion queue of the emulated NVMe storage device 722a, and the emulated NVMe storage device 722a may then generate an interrupt (e.g., a Message-Signaled Interrupt (MSI-X)) to the host operating system 708 via its storage driver(s) 708a. In response, the host operating system 708 may determine that the data write instruction provided at block 804 has been executed.

While the orchestrator device 710 has been described above as unilaterally selecting (based on the data write compression policy and other information available to it) at least one of the storage system and/or the orchestrator device to perform the data compression operations, in some embodiments the storage system may provide feedback or otherwise participate in the compression-selection process in order to influence the selection by the orchestrator device of the storage system and/or the orchestrator device to perform the data compression operations. For example, in some embodiments, the storage systems may be configured to broadcast compression availability messages to the orchestrator device 710 to indicate whether those storage systems are available to perform compression operations, with the orchestrator device selecting the storage system or the orchestrator device to perform the data compression operations based on the data write compression policy and the compression availability message(s).

In another example, in response to receiving a data write compression instruction that selects the storage system to perform compression operations, that storage system may reply to the orchestrator device 710 to indicate that the system is not available to perform compression operations, with the orchestrator device then selecting the storage system or the orchestrator device to perform the data compression operations based on the data write compression policy and that data write compression instruction reply. In yet another example, the storage system may asynchronously request that the orchestrator device 710 perform compression operations on any data is provides for storage in that storage system, with the orchestrator device then selecting the storage system or the orchestrator device to perform the data compression operations based on the data write compression policy and that asynchronous request. As such, a storage system may be configured to negotiate the performance of compression operations with the orchestrator device, or may override a data write compression policy-based decision made by the orchestrator device. As will be appreciated by one of skill in the art in possession of the present disclosure, the administrator of the LCS provisioning system may define either the orchestrator device or the storage systems as having the ability to provide a "final" override and dictate where the data compression operations will be performed (e.g., in the event both indicate they are unavailable to perform data compression operations).

Thus, following the method 800, the data provided in the data write instruction from the host operating system 708 will have been compressed and stored in the storage system 720a, with the compression operations having been performed based on the data write compression policy and by a resource device at a location that is most efficient considering the size of the data being stored, the current bandwidth of the orchestrator device to compress data, the current bandwidth of the storage system 720a to compress data, the current bandwidth of the network to transmit data, and/or any other factors that would be apparent to one of skill in the art in possession of the present disclosure.

Figure 10:
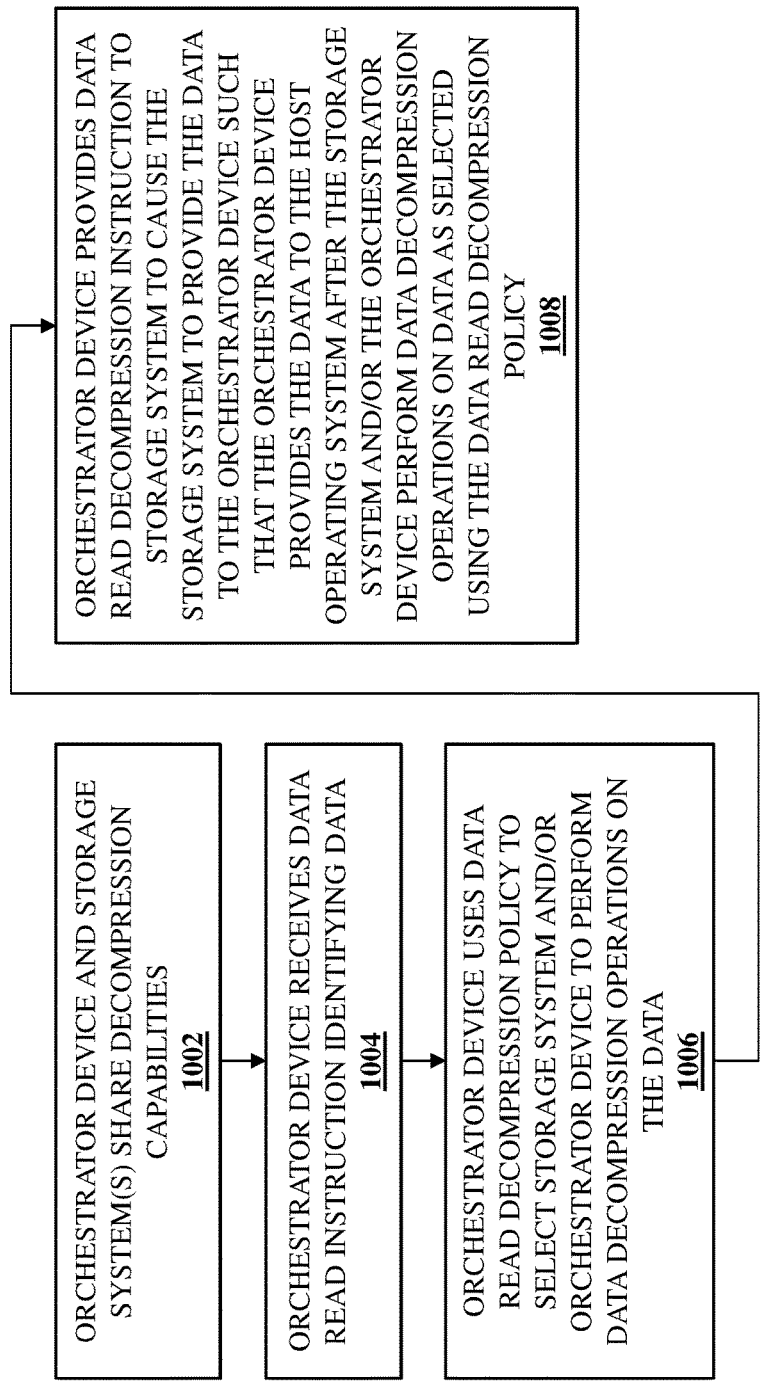
FIG. 10 is a flow chart illustrating an embodiment of a method for decompressing data for an LCS.

Referring now to FIG. 10, an embodiment of a method 1000 for decompressing data for a Logically Composed System (LCS) is illustrated. As discussed below, the systems and methods of the present disclosure provide for dynamic, policy-based utilization of decompression functionality on an LCS orchestrator device and a storage system used with an LCS in order to perform efficient data decompression operations, and may take into account properties of the data, the state of LCS resource devices, and/or other factors in order to perform the efficient data decompression operations discussed above while ensuring performance levels for the LCS/LCS resource devices. For example, the LCS data decompression system includes an orchestrator device in a resource system with a host operating system and coupled to a storage system via a network. The orchestrator device receives a read instruction from the host operating system directed to data stored in the storage system and, in response, retrieves and uses a data read decompression policy to select one of the storage system and the orchestrator device to perform data decompression operations on the data. The orchestrator device then provides a data read decompression instruction to the storage system to cause the storage system to provide the data to the orchestrator device such that the orchestrator device provides the data to the host operation system after the one of the storage system(s) and the orchestrator device selected using the data read decompression policy performs the data decompression operations on the data. As such, the efficiency of data decompression in a disaggregated system with a variety of decompression resources and locations is improved.

Figure 11A:
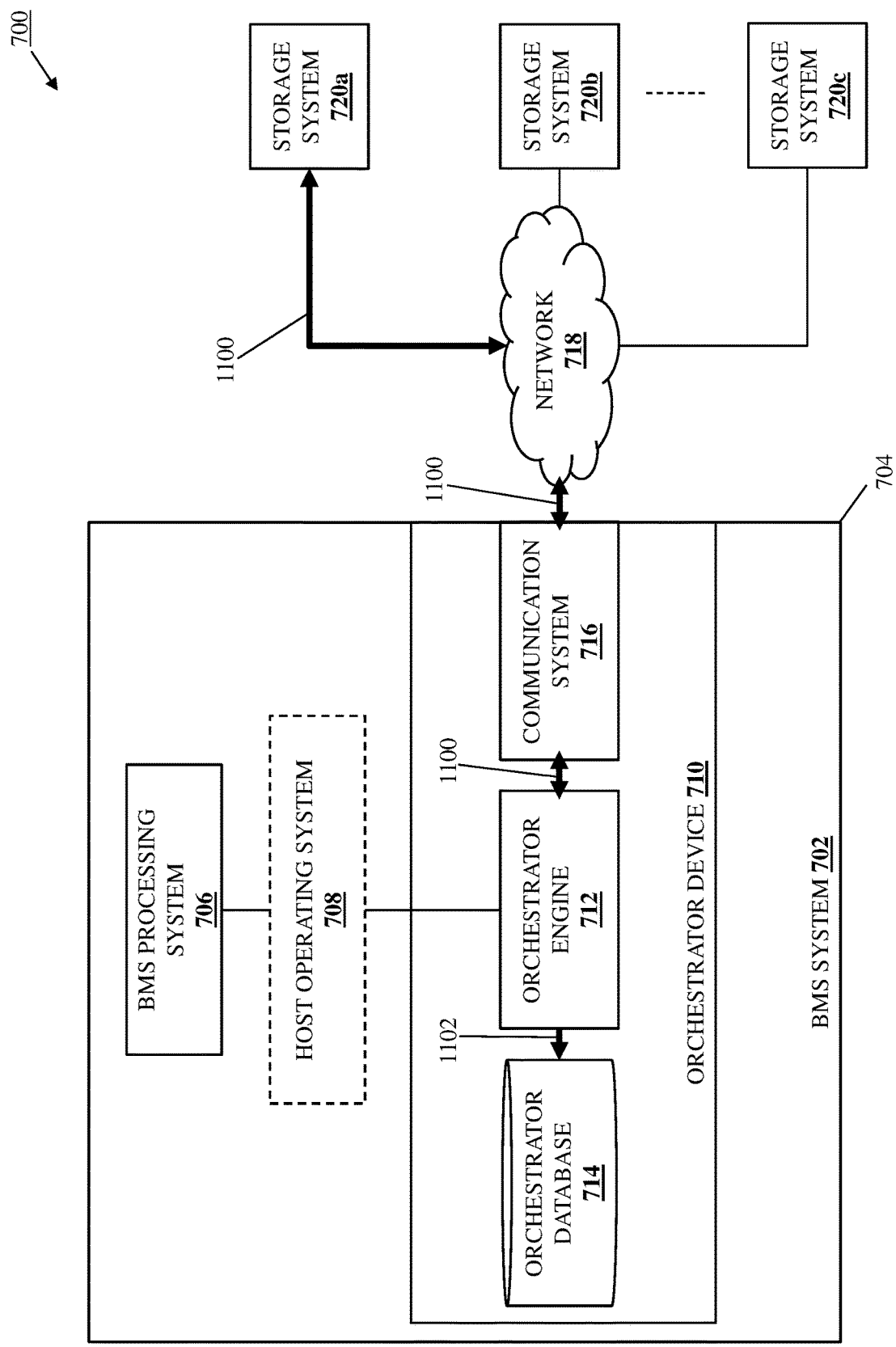
FIG. 11A is a schematic view illustrating an embodiment of the LCS data compression/decompression system of FIG. 7A operating during the method of FIG. 10.

The method 1000 begins at block 1002 where an orchestrator device and a storage system(s) share decompression capabilities. With reference to FIG. 11A, in an embodiment of block 1002, the storage systems 720a-720c and the orchestrator engine 712 in the orchestrator device 710 may perform decompression capability exchange operations 1100 that may include the orchestrator engine 712 transmitting its decompression capabilities via the communication system 716 and through the network 718 to each of the storage systems 720a-720c, and each of the storage systems 720a-720c transmitting their respective decompression capabilities through the network 718 and to the orchestrator engine 712 via its communication system 716. As illustrated in FIG. 11A, in response to receiving the decompression capabilities from the storage systems 720a-720c, the orchestrator engine 712 may perform decompression capability storage operations 1102 that include storage those decompression capabilities in the orchestrator database 714. As will be appreciated by one of skill in the art in possession of the present disclosure, the compression capability exchange operations 900/compression capability storage operations 902 discussed above as being performed during the method 800 and the decompression capability exchange operations 1100/decompression capability storage operations 1102 performed during the method 1000 may be performed at the same time while remaining within the scope of the present disclosure.

In an embodiment, the decompression capabilities transmitted during the decompression capability exchange operations 1100 may include an identification of whether decompression functionality is available, a type of decompression capability that is available (e.g., a decompression algorithm that will be used in decompression operations), any of the data write decompression polic(ies) discussed below, a protocol format for the compression metadata discussed below, and/or any other decompression capability information that one of skill in the art in possession of the present disclosure would recognize as allowing for the functionality discussed below. In some embodiments of block 1002, the decompression capability exchange operations 1100 may include, or be followed by, decompression negotiation operations between the storage systems 720a-720c and the orchestrator engine 712 in the orchestrator device 710 in order to, for example, negotiate the use of compatible decompression functionality by the orchestrator engine 712 and any of the storage systems 720a-720c. However, while the exchange of decompression capability information and the negotiation of decompression functionality has been described, one of skill in the art in possession of the present disclosure will recognize that other information may be exchanged and/or other functionality negotiated in order to provide the functionality discussed below while remaining within the scope of the present disclosure as well.

Figure 11B:
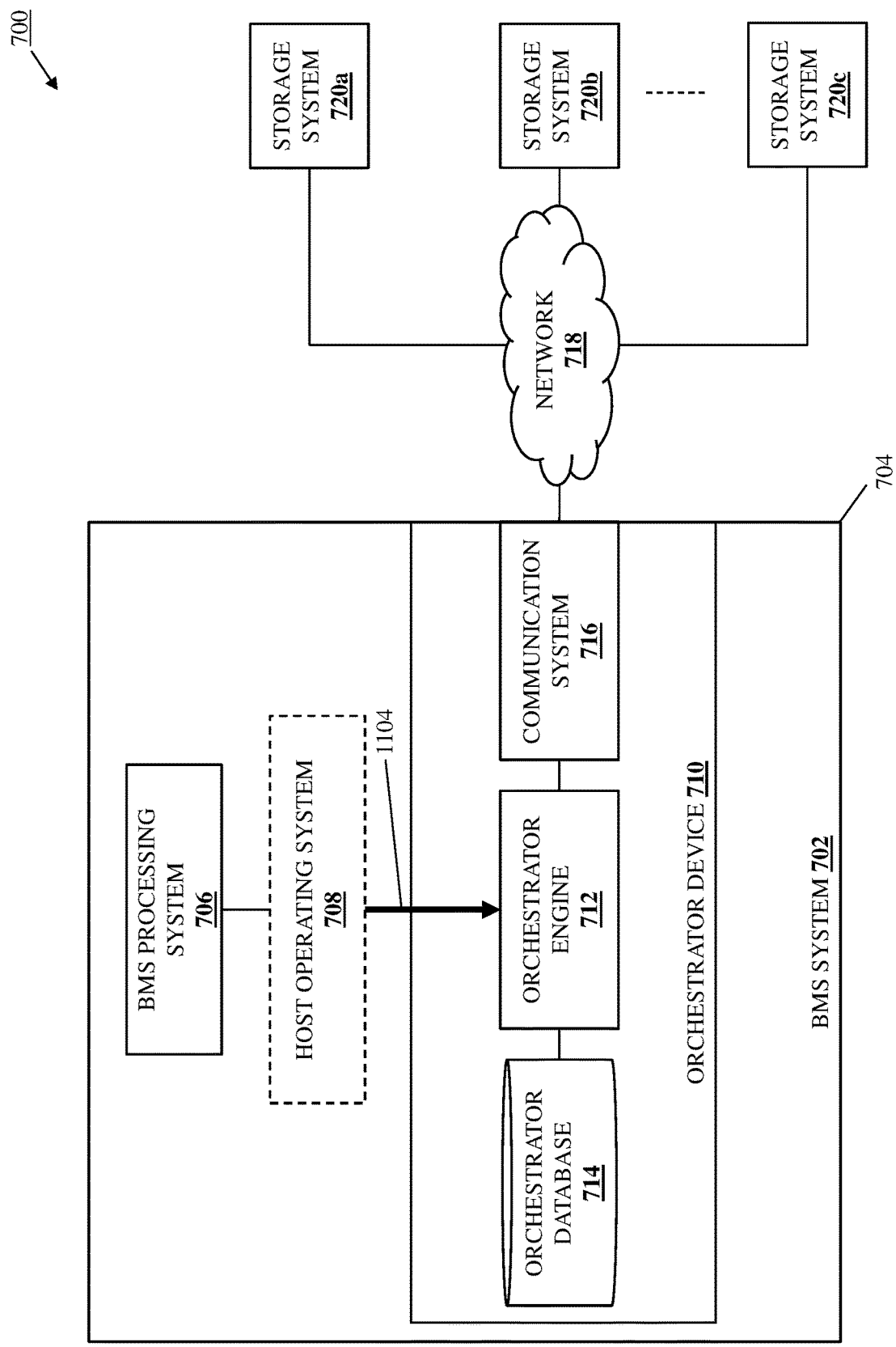
FIG. 11B is a schematic view illustrating an embodiment of the LCS data compression/decompression system of FIG. 7A operating during the method of FIG. 10.

The method 1000 then proceeds to block 1004 where the orchestrator device receives a data read instruction identifying data. With reference to FIG. 11B, in an embodiment of block 1004, the orchestrator engine 712 in the orchestrator device 710 may perform data read instruction receiving operations 1104 that include receiving a data read instruction from the host operating system 708. For example, the host operating system 708 provided for the LCS discussed above may receive an instruction from a user (e.g., via a container, application, and/or virtual machine provided by the host operating system 708 as discussed above) to retrieve data and, in response, the host operating system 708 may generate and transmit a data read instruction that identifies that data to the orchestrator engine 712 in the orchestrator device 710.

To provide a specific example in which the emulated storage device 722a is an emulated NVMe storage device 722a, at block 1004 a host NVMe initiator provided by the host operating system 708 may provide the data read instruction in an NVMe storage device submission queue of the emulated NVMe storage device 722a, and then may ring a doorbell for the emulated NVMe storage device 722a. In response, the emulated NVMe storage device 722a/storage controller 722b will read the NVMe storage device submission queue to retrieve the data read instruction. However, while a specific example is provided, one of skill in the art in possession of the present disclosure will appreciate that the orchestrator engine 712 in the orchestrator device 710 may receive the data read instruction in a variety of manners that will fall within the scope of the present disclosure as well.

Figure 11C:
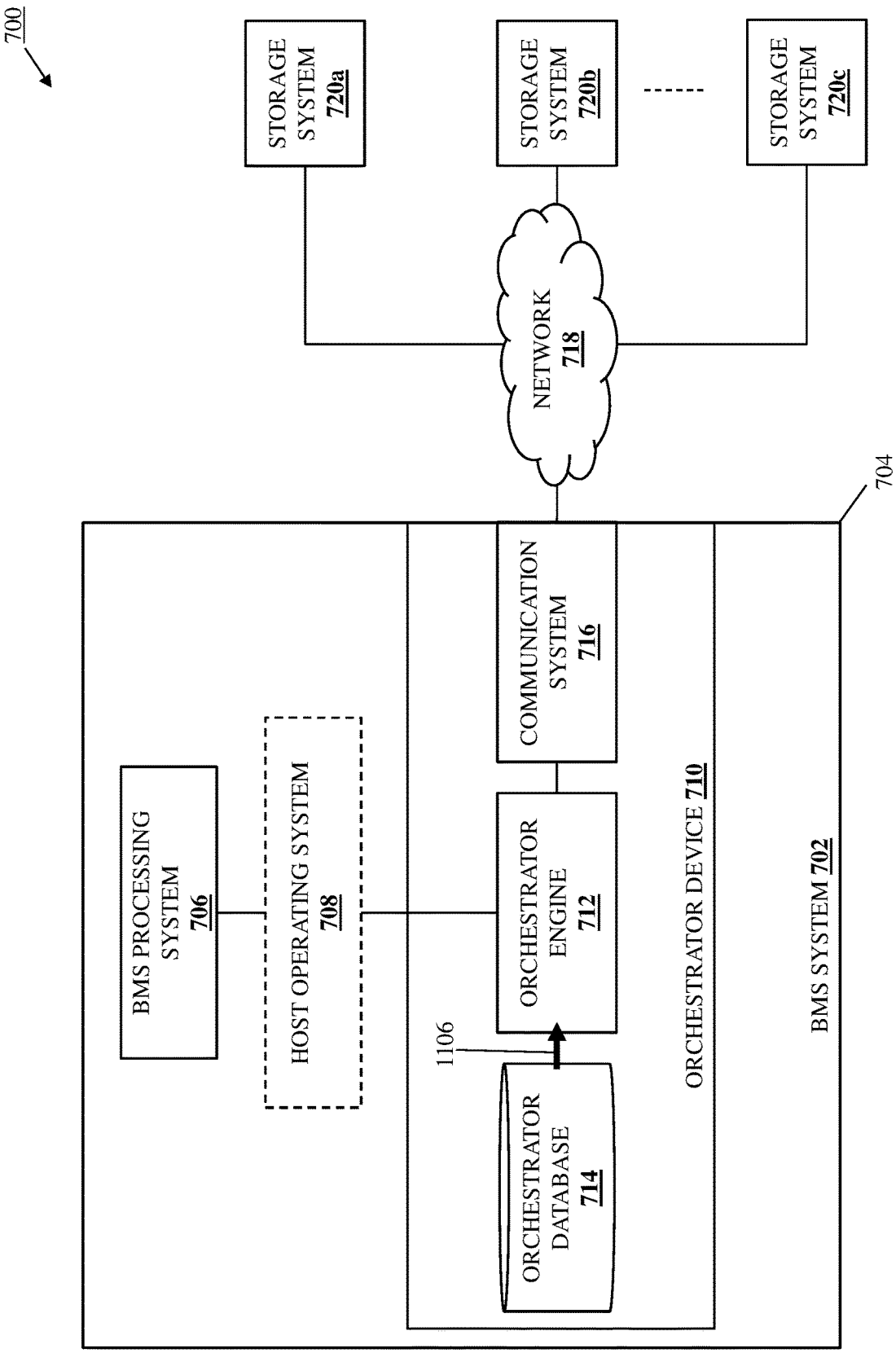
FIG. 11C is a schematic view illustrating an embodiment of the LCS data compression/decompression system of FIG. 7A operating during the method of FIG. 10.

The method 1000 then proceeds to block 1006 where the orchestrator device uses a data read decompression policy to select the storage system or the orchestrator device to perform data decompression operations on the data. With reference to FIG. 11C, in an embodiment of block 1006, the orchestrator engine 712 in the orchestrator device 710 may perform data read decompression policy retrieval operations 1106 that include accessing a data read decompression policy that is stored in the orchestrator database 714. As will be appreciated by one of skill in the art in possession of the present disclosure, the data read decompression policies described herein may be provided in orchestrator devices in resource systems (e.g., in the orchestrator device 710 in the BMS system 702 in FIG. 11C) by an administrator of the LCS provisioning system discussed above, and may define how data decompression operations should be performed for any LCS provided using that orchestrator device. As such, the data read decompression policy retrieved at block 1006 may have been generated and stored in the orchestrator database 714 prior to the method 1000, and many include any of a variety of policy details that provide for the data decompression functionality described below.

As will be appreciated by one of skill in the art in possession of the present disclosure, the data read decompression policy may include any of a variety of policy details that define when, where, and how data will be decompressed as part of a data read operation. For example, a relatively simple data read decompression policy may define a data size over which data will be transmitted to the orchestrator device without performing data decompression operations on that data, and under which data decompression operations will be performed on that data prior to transmitting that data to the orchestrator device. As such, the data read decompression policy may consider data transfer bandwidth savings (e.g., data transfer bandwidth savings realized via the transmission of compressed data vs. decompressed data) when determining how, when, and where to perform data decompression operations.

In another example, another relatively simple data read decompression policy may define an orchestrator device processing bandwidth over which data will be transmitted to the orchestrator device without performing data decompression operations on that data, and under which data decompression operations will be performed on that data prior to transmitting that data to the orchestrator device. In another example, another relatively simple data read decompression policy may define a storage system processing bandwidth under which data will be transmitted to the orchestrator device without performing data decompression operations on that data, and over which data decompression operations will be performed on that data prior to transmitting that data to the orchestrator device. As such, the data read decompression policy may consider CPU utilization (e.g., current CPU utilization in either or both of the orchestrator device and the storage system) when determining how, when, and where to perform data decompression operations.

In another example, another relatively simple data read decompression policy may define network bandwidth under which data will be transmitted to the orchestrator device without performing data decompression operations on that data, and over which data decompression operations will be performed on that data prior to transmitting that data to the orchestrator device. For example, the orchestrator device may be configured to identify a network bandwidth based on an amount of data traffic that is being transmitted via its communication system 716 (e.g., via a NIC port that is coupled to the network 718). As such, the data read decompression policy may consider data transfer bandwidth (e.g., data transfer bandwidth currently available in the network) when determining how, when, and where to perform data decompression operations.

Furthermore, one of skill in the art in possession of the present disclosure will appreciate how the relatively simple data read decompression policies discussed above may be combined to generate relatively more complex data read decompression policies that consider data size, orchestrator processing bandwidth, storage system processing bandwidth, network bandwidth, as well as any other factors that would be apparent to one of skill in the art in possession of the present disclosure. For example, at block 1106 the orchestrator engine 712 in the orchestrator device 710 may select the storage system 720a or the orchestrator device 710 to perform data decompression based on a data block/shard size, processing statistics generated by the storage system 720a and/or orchestrator device 710, network statistics, information indicative of a network bottleneck, etc. However, while a few specific data read decompression policies have been described, one of skill in the art in possession of the present disclosure will appreciate how data read decompression policies of varying complexity may define when, where, and how decompression should be performed when retrieving compressed data from a storage system and providing it to a host operating system while remaining within the scope of the present disclosure as well.

Similarly as described above for the compression operations in the method 800, one of skill in the art in possession of the present disclosure will recognize that the orchestrator engine 712 in the orchestrator device 710 may have access to any of a variety of information about the operation of the LCS (and the resource devices used to provide that LCS) in order to utilize the data read decompression policy to select a storage system or the orchestrator device to perform data compression operations on the compressed data. For example, in order to determine the orchestrator device processing bandwidth discussed above, the orchestrator engine 712 may have access to orchestrator processing system telemetry data and/or other operating information. Similarly, in order to determine the storage system processing bandwidth discussed above, the orchestrator engine 712 may have access to storage system processing system telemetry data and/or other operating information via the network 718. Similarly as well, in order to determine the network bandwidth discussed above, the orchestrator engine 712 may have access to network operating information via its communication system 716.

As such, at block 806, the orchestrator engine 712 in the orchestrator device 710 may use the data read decompression policy and any of the information discussed above in order to select one of the storage systems 720a-720c or the orchestrator device 710 to perform data decompression operations on the compressed data. In some of the specific examples provided below, the orchestrator engine 712 in the orchestrator device 710 selects the storage system 720a that stores the compressed data for performing decompression operations, but one of skill in the art in possession of the present disclosure will appreciate how the other storage systems 720b-720c may store the compressed data and/or may be selected to perform the decompression operations while remaining within the scope of the present disclosure as well. For example, some embodiments of block 1006 may include the orchestrator engine 712 in the orchestrator device 710 using the data read decompression policy and any of the information discussed above in order to select the orchestrator device 710 to perform data decompression operations on the compressed data. In another example, some embodiments of block 806 may include the orchestrator engine 712 in the orchestrator device 710 using the data read decompression policy and any of the information discussed above in order to select the storage system 720a to perform data decompression operations on the compressed data.

In some embodiments, the data read decompression policy may define a data size threshold over which more information may be retrieved and used in order to select the storage system 720a and/or the orchestrator device 710 to perform the data decompression operations, and under which that information will not be retrieved or used in order to select the storage system 720a and/or the orchestrator device 710 to perform the data decompression operations. To provide a specific example, if the host operating system 708 provides a data read instruction for data with a size of 4 KB, the latency associated with requesting the compression metadata and/or other information discussed below may not justify doing so, while if the host operating system 708 requests data with a larger size, the additional latency associated with requesting the compression metadata and/or other information discussed below may not substantially increase the latency associated with the retrieval of that data and thus may be justified. However, one of skill in the art in possession of the present disclosure will appreciate how the 4 KB size threshold provided in the specific example above may be reduced in the future.

Figure 11D:
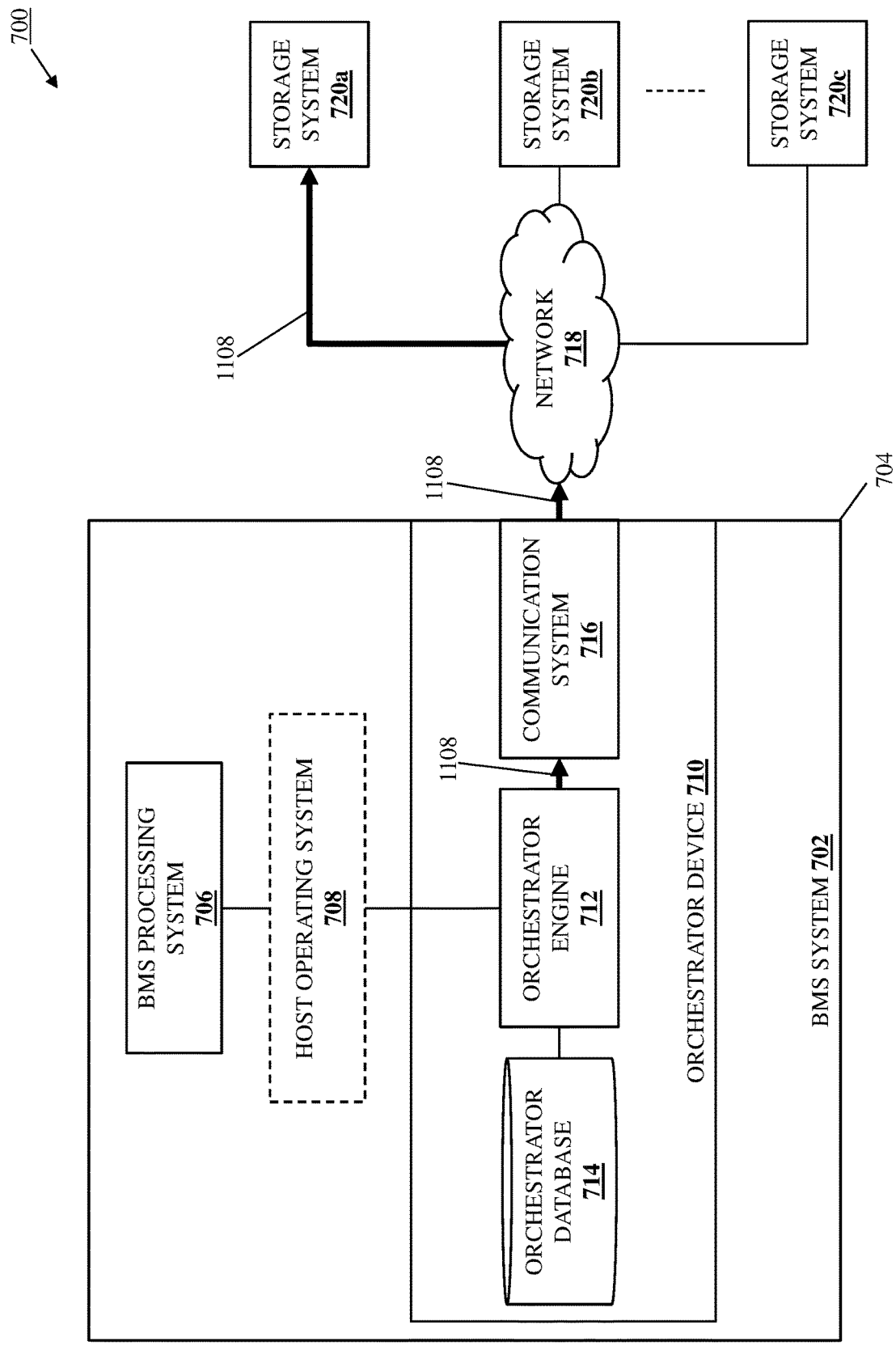
FIG. 11D is a schematic view illustrating an embodiment of the LCS data compression/decompression system of FIG. 7A operating during the method of FIG. 10.
Figure 11E:
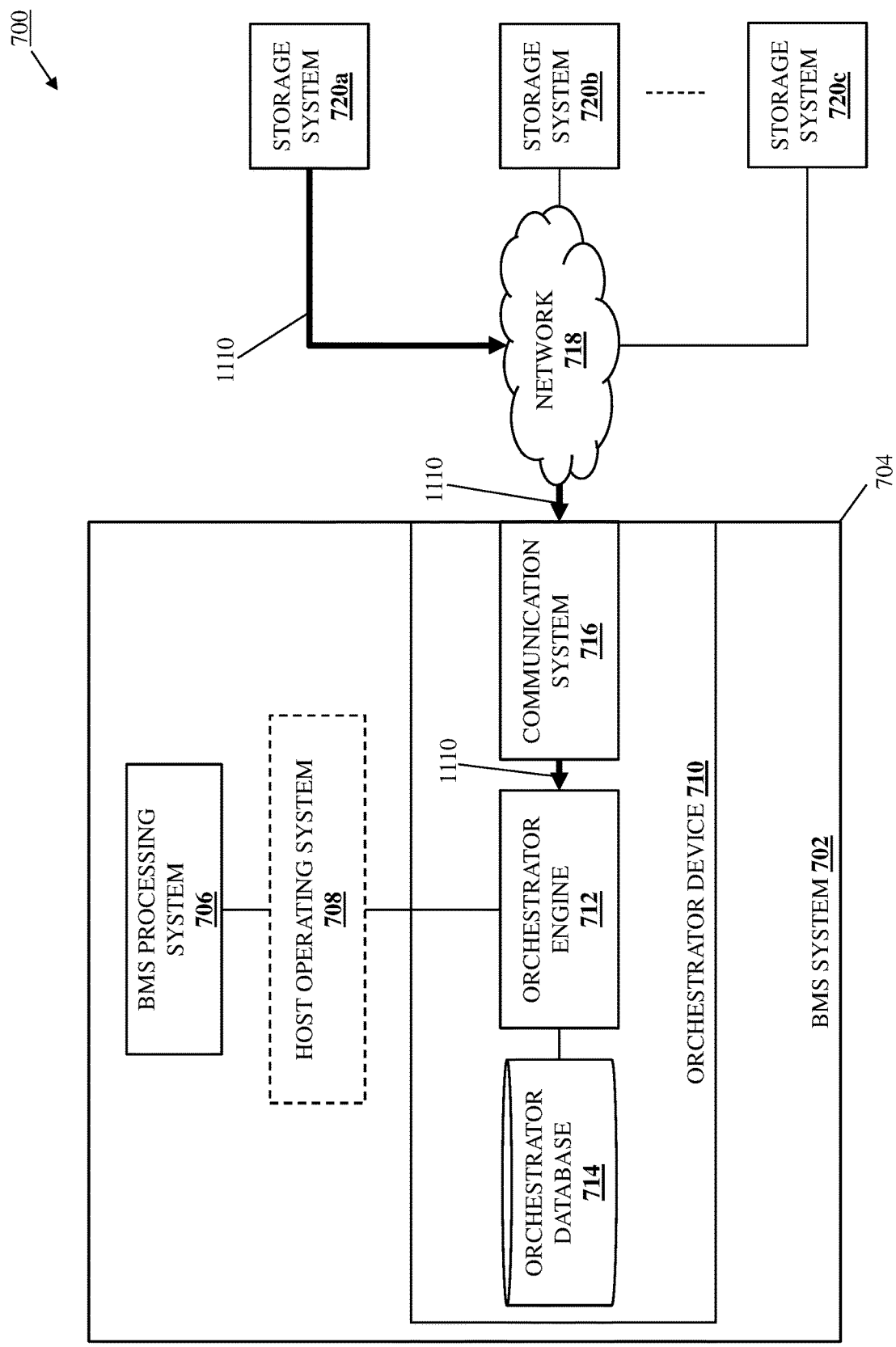
FIG. 11E is a schematic view illustrating an embodiment of the LCS data compression/decompression system of FIG. 7A operating during the method of FIG. 10.

For example, with reference to FIGS. 11D and 11E and in an embodiment of block 1008, the data identified in the data read instruction may include a size above the data size threshold defined in the data read decompression policy and, in response, the orchestrator engine 712 in the orchestrator device 710 may perform compression metadata retrieval operations 1108 that include transmitting a compression metadata request for compression metadata associated with the data that was requested in the data read instruction via its communication system 716 and through the network 718 to the storage system 720a. In response, storage system 720a may perform compression metadata provisioning operations 1110 that includes transmitting the compression metadata associated with the data that was requested in the data read instruction through the network 718 and to the orchestrator engine 712 via its communication system 716.

As discussed above, the compression metadata may include any details about the compression of data that would be required by another device or system that did not perform that compression in order to decompress that data, and allows the decompression operations discussed below to be performed anywhere in the disaggregated system/LCS regardless of where the compression operations were performed. Furthermore, the compression metadata retrieved as discussed above may identify a compression algorithm that was used to compress the data, a compression ratio of the decompressed data to the compressed data, a size of the decompressed data, a size of the compressed data, a checksum for the compressed data, and/or any other compression metadata that one of skill in the art in possession of the present disclosure would recognize as providing for the decompression functionality described below. Thus, at block 1008, the orchestrator engine 712 in the orchestrator device 710 may utilize the compression metadata that stores compression details about the compressed data, along with the data read decompression policy, in order to select the storage system 720a and/or the orchestrator device 710 to perform the decompression operations on that compressed data, and may generate a data read decompression instruction that identifies that selection.

In embodiments in which the orchestrator engine 712 in the orchestrator device 710 selects the orchestrator device 710 to perform data decompression operations on the compressed data, the orchestrator engine 712 may operate to generate a data read decompression instruction that identifies the compressed data stored in the storage system 720a and instructs the storage system to transmit that compressed data to the orchestrator device 710. In embodiments in which the orchestrator engine 712 in the orchestrator device 710 selects the storage system 720a to perform data decompression operations on the compressed data, the orchestrator engine 712 may operate to generate a data read decompression instruction that identifies the compressed data stored in the storage system 720a and instructs the storage system to decompress that compressed data before transmitting the decompressed data to the orchestrator device 710.

Figure 11F:
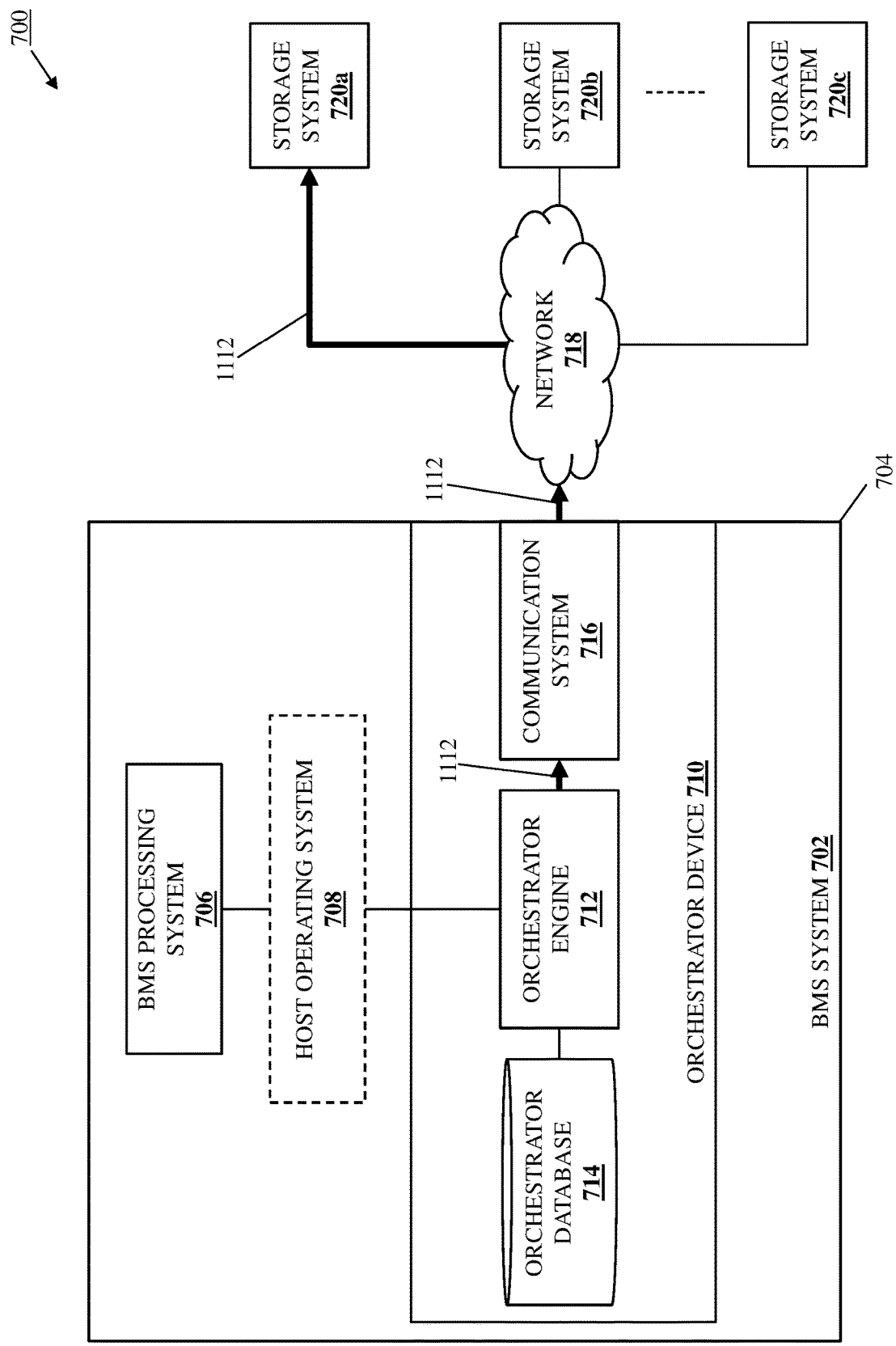
FIG. 11F is a schematic view illustrating an embodiment of the LCS data compression/decompression system of FIG. 7A operating during the method of FIG. 10.

The method 1000 then proceeds to block 1008 where the orchestrator device provides a data read decompression instruction to the storage system to cause the storage system to provide the data to the orchestrator device such that the orchestrator device provides the data to the host operating system after the storage system or the orchestrator device selected using the data read decompression policy performs data decompression operations on the data. With reference to FIG. 11F, in an embodiment of block 1008, the orchestrator engine 712 in the orchestrator device 710 may perform data read decompression instruction transmission operations 1112 that include transmitting the data read decompression instruction via its communication system 716 and through the network 718 to the storage system 720a.

Figure 11G:
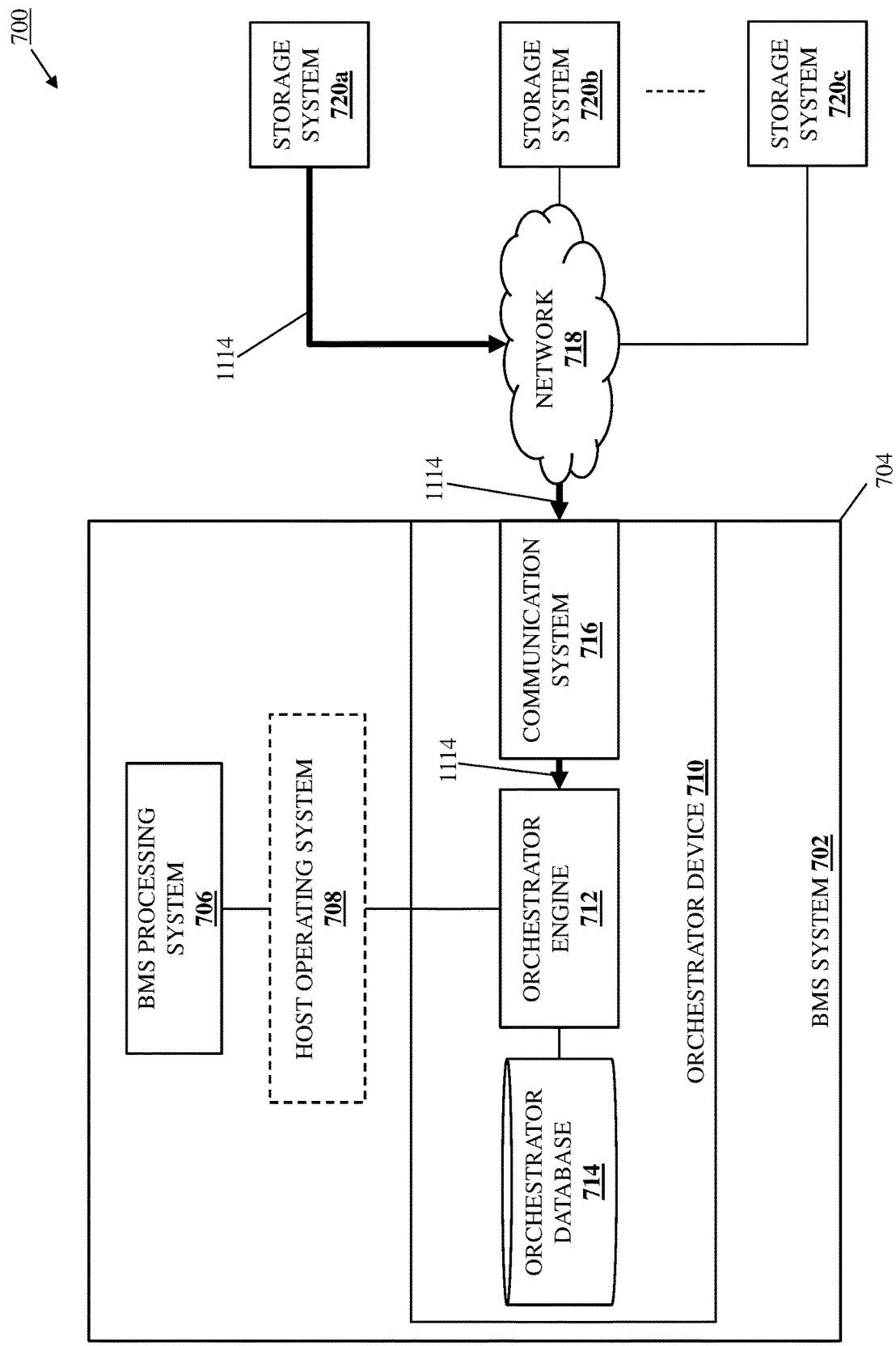
FIG. 11G is a schematic view illustrating an embodiment of the LCS data compression/decompression system of FIG. 7A operating during the method of FIG. 10.
Figure 11H:
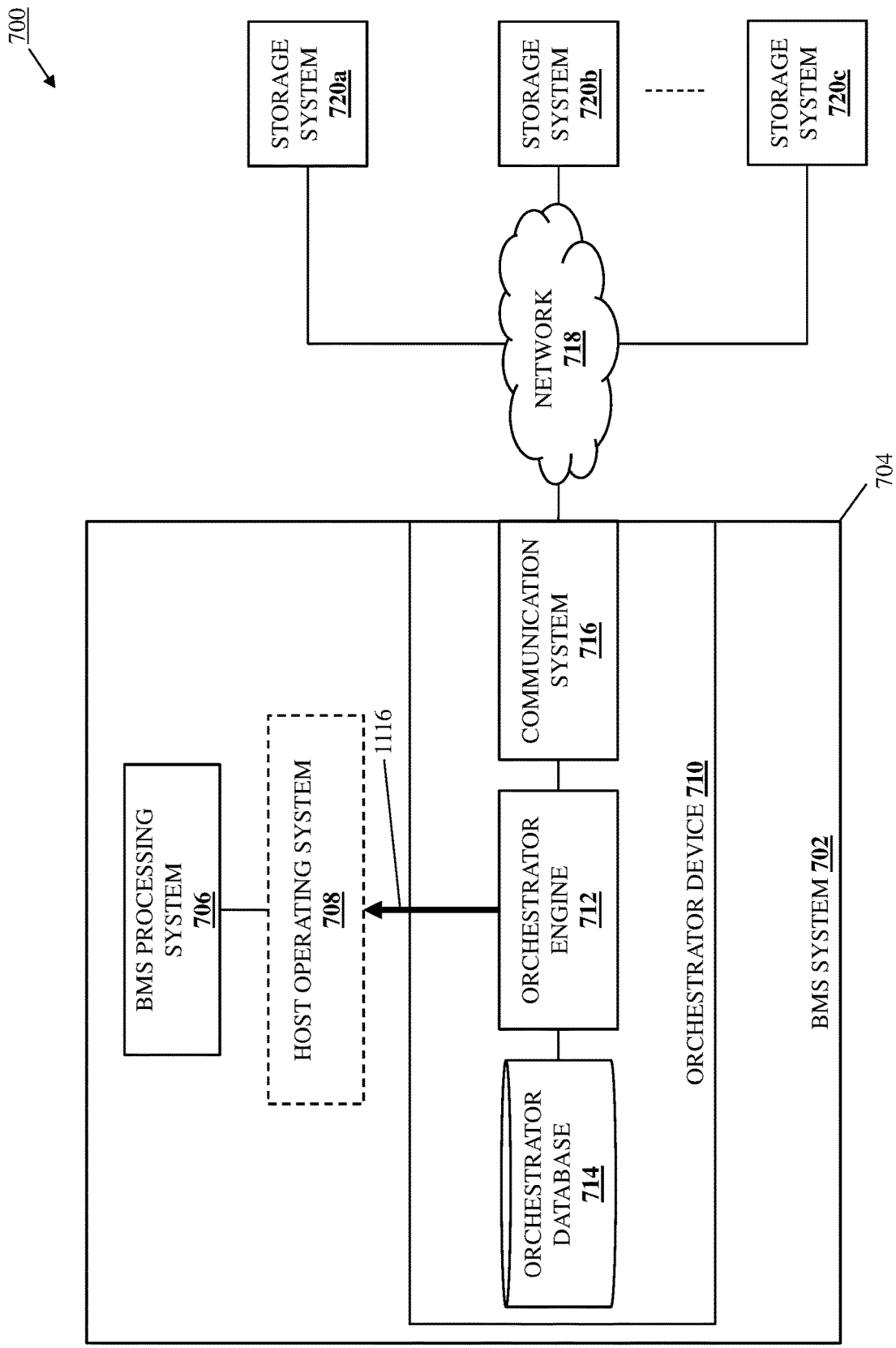
FIG. 11H is a schematic view illustrating an embodiment of the LCS data compression/decompression system of FIG. 7A operating during the method of FIG. 10.

Continuing with the example above in which the orchestrator device 710 was selected to perform data decompression operations, the data read decompression instruction may identify the compressed data and/or any other information that would be apparent to one of skill in the art in possession of the present disclosure. With reference to FIG. 11G, in an embodiment of block 1008 and in response to receiving the data read decompression instruction, the storage system 720a may perform data provisioning operations that include providing the compressed data through the network 718 to the storage system 720a via its communication system 716, with the orchestrator engine 712 decompressing that compressed data (e.g., using the compression service 722d discussed above with reference to FIG. 7B) to provide decompressed data. With reference to FIG. 11H, the orchestrator engine 712 in the orchestrator device 710 may then perform data provisioning operation to provide the decompressed data to the host operating system 708, thus completing the data read instruction.

Continuing with the example above in which the storage system 720a was selected to perform data decompression operations, the data read decompression instruction may identify the compressed data, instruct the decompression of that compressed data, and/or provide any other information that would be apparent to one of skill in the art in possession of the present disclosure. With reference back to FIG. 11G, in an embodiment of block 1008 and in response to receiving the data read decompression instruction, the storage system 720a may perform data provisioning operations that include retrieving the compressed data, decompressing that compressed data to provide uncompressed data, and providing the uncompressed data through the network 718 to the orchestrator engine 712 via its communication system 716. With reference to FIG. 11H, the orchestrator engine 712 in the orchestrator device 710 may then perform the data provisioning operations 1116 to provide the decompressed data to the host operating system 708, thus completing the data read instruction. As will be appreciated by one of skill in the art in possession of the present disclosure, in some embodiments the data provisioning operation 1116 may include the orchestrator engine 712 retrieving a portion of the uncompressed data and providing only that portion of the uncompressed data to the host operating system 708. For example, the data read instruction may have identified that portion of the data that is stored in a larger compressed block of data, and thus the decompression of that portion of the data may require decompression of the larger compressed block of that data, with only that portion of the data being returned to the host operating system 708 following decompression.

Continuing with the specific example in which the emulated storage device 722a is an emulated NVMe storage device 722a, at block 1008 the storage controller 722b may provide a completion message in an NVMe storage device completion queue of the emulated NVMe storage device 722a, and the emulated NVMe storage device 722a may then generate an interrupt (e.g., a Message-Signaled Interrupt (MSI-X)) to the host operating system 708 via its storage driver(s) 708a. In response, the host operating system 708 may determine that the data read instruction provided at block 804 has been executed, and may retrieve the uncompressed data from the emulated NVMe storage device 722a (e.g., from physical system memory that provides the storage for the emulated NVMe storage device 722a).

While the orchestrator device 710 has been described above as unilaterally selecting (based on the data read decompression policy and other information available to it) the storage system or the orchestrator device to perform the data decompression operations, in some embodiments the storage system may provide feedback in order to influence the selection by the orchestrator device of the storage system and/or the orchestrator device to perform the data decompression operations. For example, in some embodiments, the storage systems may be configured to broadcast decompression availability messages to the orchestrator device 710 to indicate whether those storage systems are available to perform decompression operations, with the orchestrator device selecting the storage system and/or the orchestrator device to perform the data decompression operations based on the data read decompression policy and the decompression availability me s s age(s).

In another example, in response to receiving a data read decompression instruction that selects the storage system to perform decompression operations, that storage system may reply to the orchestrator device 710 to indicate that storage system is not available to perform decompression operations, with the orchestrator device then selecting the storage system and/or the orchestrator device to perform the data decompression operations based on the data read decompression policy and that data read decompression instruction reply. In yet another example, the storage system may asynchronously request that the orchestrator device 710 perform decompression operations, with the orchestrator device then selecting the storage system and/or the orchestrator device to perform the data decompression operations based on the data read decompression policy and that asynchronous request. As such, a storage system may be configured to negotiate the performance of decompression operations with the orchestrator device, or may override a data read decompression policy-based decision made by the orchestrator device. Similarly as discussed above, the administrator of the LCS provisioning system may define either the orchestrator device or the storage systems as having the ability to provide a "final" override and dictate where the data decompression operations will be performed (e.g., in the event both indicate they are unavailable to perform data decompression operations).

Thus, systems and methods have been described that provide for dynamic, policy-based utilization of decompression functionality on an LCS orchestrator device and a storage system used with an LCS in order to perform efficient data decompression, and may take into account properties of the data, the state of LCS resource devices, and/or other factors in order to perform the efficient data decompression discussed above while ensuring performance levels for the LCS/LCS resource devices. For example, the LCS data decompression system of the present disclosure may include an orchestrator device in a resource system with a host operating system and coupled to a storage system via a network. The orchestrator device receives a read instruction from the host operating system identifying data stored in the storage system and, in response, retrieves and uses a data read decompression policy to select one of the storage system and the orchestrator device to perform data decompression operations on the data. The orchestrator device then provides a data read decompression instruction to the storage system to cause the storage system to provide the data to the orchestrator device such that the orchestrator device provides the data to the host operation system after the one of the storage system and the LCS orchestrator device selected using the data read decompression policy performs the data decompression operations on the data. As such, the efficiency of data decompression in a disaggregated system with a variety of decompression resources and locations is improved.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) data compression/decompression system, comprising:
   a resource system providing a host operating system for a Logically Composed System (LCS);
   a storage system including a plurality of disaggregated storage devices that are each located in different locations, that are each used by host operating system for the LCS, and that are each configured to perform data decompression operations; and
   an orchestrator device that is included in the resource system and that is configured to perform the data decompression operations, wherein the orchestrator device is coupled to the storage system via a network and configured to:
      receive, during a first time period from the storage system, a first decompression availability message;
      receive, during the first time period from the host operating system, a first read instruction to perform a first read operation on first compressed data that is stored in at least one of the plurality of disaggregated storage devices included in the storage system;
      retrieve, during the first time period from an orchestrator database in the orchestrator device in response to receiving the first read instruction, a data read decompression policy;
      select, during the first time period using the data read decompression policy and the first decompression availability message, the storage system to perform the data decompression operations on the first compressed data;
      provide, during the first time period to the storage system via the network, a first data read decompression instruction that is configured to cause the storage system to perform the data decompression operations on the first compressed data to provide first decompressed data, and transmit the first decompressed data to the orchestrator device;
      receive, during the first time period from the storage system, the first decompressed data;
      provide, during the first time period, the first decompressed data to the host operating system;
      receive, during a second time period from the storage system, a second decompression availability message;
      receive, during the second time period from the host operating system, a second read instruction to perform a second read operation on second compressed data that is stored in at least one of the plurality of disaggregated storage devices included in the storage system;
      retrieve, during the second time period from the orchestrator database in the orchestrator device in response to receiving the second read instruction, the data read decompression policy;

select, during the second time period using the data read decompression policy and the second decompression availability message, the orchestrator device to perform the data decompression operations on the second compressed data;

provide, during the second time period to the storage system via the network, a second data read decompression instruction that is configured to cause the storage system to transmit the second compressed data to the orchestrator device;

receive, during the second time period from the storage system, the second compressed data;

perform, during the second time period, the data decompression operations on the second compressed data to provide second decompressed data; and provide, during the second time period, the second decompressed data to the host operating system.

2. The system of claim 1, wherein the LCS orchestrator device is configured to:

retrieve, during the second time period from the storage system via the network, compression metadata for the second compressed data, wherein the orchestrator device selects the orchestrator device to perform the data decompression operations on the second compressed data using each of the data read decompression policy, the second decompression availability message, and the compression metadata for the second compressed data.

3. The system of claim 2, wherein the LCS orchestrator device is configured to:

determine that the second compressed data exceeds a data size threshold and, in response, retrieve the compression metadata.

4. The system of claim 1, wherein the orchestrator device is configured to:

receive, from the storage system via the network, storage system operating information, wherein the orchestrator device selects the storage system to perform the data decompression operations on the first compressed data using each of the data read decompression policy, the first decompression availability message, and the storage system operating information.

5. The system of claim 1, wherein the storage system and the orchestrator device are each configured to perform data compression operations, and wherein the orchestrator device is configured to:

receive, during a third time period from the storage system, a first compression availability message;

receive, during the third time period from the host operating system prior to receiving the first read instruction, a first write instruction to perform a first write operation in the storage system using first data that is included in the first write instruction;

retrieve, during the third time period from the orchestrator database in the orchestrator device in response to receiving the first write instruction, a data write compression policy;

select, during the third time period using the data write compression policy and the first compression availability message, the storage system to perform the data compression operations on the first data;

provide, during the third time period to the storage system via the network along with the first data, a first data write compression instruction that is configured to cause the storage system to performs the data compression operations on the first data to provide the first compressed data and store the first compressed data in at least one of the plurality of disaggregated storage devices included in the storage system;

receive, during a fourth time period from the storage system, a second compression availability message;

receive, during the fourth time period from the host operating system prior to receiving the second read instruction, a second write instruction to perform a second write operation in the storage system using second data that is included in the second write instruction;

retrieve, during the fourth time period from the orchestrator database in the orchestrator device in response to receiving the second write instruction, the data write compression policy;

select, during the fourth time period using the data write compression policy and the second compression availability message, the orchestrator device to perform the data compression operations on the second data;

perform, during the fourth time period, the data compression operations on the second data to provide the second compressed data; and provide, during the fourth time period to the storage system, the second compressed data along with a second data write compression instruction that is configured to cause the storage system to store the second compressed data in at least one of the plurality of disaggregated storage devices included in the storage system.

6. The system of claim 5, wherein the orchestrator device is configured to:

generate, along with performing the data compression operations on the second data to provide the second compressed data, compression metadata for the second compressed data; and provide, to the storage system via the network, the compression metadata for the second compressed data in the second data write compression instruction.

7. An Information Handling System (IHS), comprising:

a processing system; and a memory system that is coupled to the processing system and that includes instructions that, when executed by the processing system, cause the processing system to provide an orchestrator engine that is configured to:

receive, during a first time period from a storage system that is coupled to the processing system, a first decompression availability message;

receive, during the first time period from a host operating system, a first read instruction to perform a first read operation on first compressed data that is stored in at least one of a plurality of disaggregated storage devices that are included in the storage system;

retrieve, during the first time period from an orchestrator database that is coupled to the processing system in response to receiving the first read instruction, a data read decompression policy;

select, during the first time period using the data read decompression policy and the first decompression availability message, the storage system to perform data decompression operations on the first compressed data;

provide, during the first time period to the storage system via a network, a first data read decompression instruction that is configured to cause the storage system to perform the data decompression operations on the first compressed data to provide first decompressed data, and transmit the first decompressed data to the orchestrator engine;

receive, during the first time period from the storage system, the first decompressed data;

provide, during the first time period, the first decompressed data to the host operating system;

receive, during a second time period from the storage system, a second decompression availability message;

receive, during the second time period from the host operating system, a second read instruction to perform a second read operation on second compressed data that is stored in at least one of the plurality of disaggregated storage devices included in the storage system;

retrieve, during the second time period from the orchestrator database in the orchestrator device in response to receiving the second read instruction, the data read decompression policy;

select, during the second time period using the data read decompression policy and the second decompression availability message, the orchestrator device to perform the data decompression operations on the second compressed data;

provide, during the second time period to the storage system via the network, a second data read decompression instruction that is configured to cause the storage system to transmit the second compressed data to the orchestrator device;

receive, during the second time period from the storage system, the second compressed data;

perform, during the second time period, the data decompression operations on the second compressed data to provide second decompressed data; and provide, during the second time period, the second decompressed data to the host operating system.

8. The IHS of claim 7, wherein the orchestrator engine is configured to:

retrieve, during the second time period from the storage system via the network, compression metadata for the second compressed data, wherein the LCS orchestrator engine selects the orchestrator engine to perform the data decompression operations on the second compressed data using each of the data read decompression policy, the second decompression availability message, and the compression metadata for the second compressed data.

9. The IHS of claim 8, wherein the orchestrator engine is configured to:

determine that the second compressed data exceeds a data size threshold and, in response, retrieve the compression metadata.

10. The IHS of claim 7, wherein the orchestrator engine is configured to:

receive, from the storage system via the network, storage system operating information, wherein the orchestrator engine selects the storage system to perform the data decompression operations on the first compressed data using each of the data read decompression policy, the first decompression availability message, and the storage system operating information.

11. The IHS of claim 7, wherein the orchestrator engine is configured to:

receive, during a third time period from the storage system, a first compression availability message;

receive, during the third time period from the host operating system prior to receiving the first read instruction, a first write instruction to perform a first write operation in the storage system using first data that is included in the first write instruction;

retrieve, during the third time period from the orchestrator database in the orchestrator device in response to receiving the write instruction, a data write compression policy;

select, during the third time period using the data write compression policy and the first compression availability message, the storage system to perform the data compression operations on the first data;

provide, during the third time period to the storage system via the network along with the first data, a first data write compression instruction that is configured to cause the storage system to performs the data compression operations on the first data as selected using the data write compression policy to provide the first compressed data and store the first compressed data in at least one of the plurality of disaggregated storage devices included in the storage system;

receive, during a fourth time period from the storage system, a second compression availability message;

receive, during the fourth time period from the host operating system prior to receiving the second read instruction, a second write instruction to perform a second write operation in the storage system using second data that is included in the second write instruction;

retrieve, during the fourth time period from the orchestrator database in the orchestrator device in response to receiving the second write instruction, the data write compression policy;

select, during the fourth time period using the data write compression policy and the second compression availability message, the orchestrator engine to perform the data compression operations on the second data;

perform, during the fourth time period, the data compression operations on the second data to provide the second compressed data; and provide, during the fourth time period to the storage system, the second compressed data along with a second data write compression instruction that is configured to cause the storage system to store the second compressed data in at least one of the plurality of disaggregated storage devices included in the storage system.

12. The IHS of claim 7, wherein the orchestrator engine is configured to:

generate, along with performing the data compression operations on the second data to provide the second compressed data, compression metadata for the second compressed data; and provide, to the storage system via the network, the compression metadata for the second compressed data in the second data write compression instruction.

13. The IHS of claim 12, wherein the compression metadata for the second compressed data includes at least one of a compression algorithm that was used to compress the second compressed data, a compressed size of the second compressed data, a decompressed size of the second compressed data, and a checksum for the second compressed data.

14. A method for decompressing data for a Logically Composed System (LCS), comprising:

receiving, by an orchestrator device during a first time period from a storage system, a first decompression availability message;

receiving, by the orchestrator device during the first time period from a host operating system, a first read instruction to perform a first read operation on first compressed data that is stored in at least one of the plurality of disaggregated storage devices included in the storage system;
retrieving, by the orchestrator device during the first time period from an orchestrator database in the orchestrator device in response to receiving the first read instruction, a data read decompression policy;
selecting, by the orchestrator device during the first time period using the data read decompression policy and the first decompression availability message, the storage system to perform data decompression operations on the first compressed data;
providing, by the orchestrator device during the first time period to the storage system via a network, a first data read decompression instruction that is configured to cause the storage system to perform the data decompression operations on the first compressed data to provide first decompressed data, and transmit the first decompressed data to the orchestrator device;
receiving, by the orchestrator device during the first time period from the storage system, the first decompressed data;
providing, by the orchestrator device during the first time period, the first decompressed data to the host operating system;
receiving, by the orchestrator device during a second time period from the storage system, a second decompression availability message;
receiving, by the orchestrator device during the second time period from the host operating system, a second read instruction to perform a second read operation on second compressed data that is stored in at least one of the plurality of disaggregated storage devices included in the storage system;
retrieving, by the orchestrator device during the second time period from the orchestrator database in the orchestrator device in response to receiving the second read instruction, the data read decompression policy;
selecting, by the orchestrator device during the second time period using the data read decompression policy and the second decompression availability message, the orchestrator device to perform the data decompression operations on the second compressed data;
providing, by the orchestrator device during the second time period to the storage system via the network, a second data read decompression instruction that is configured to cause the storage system to transmit the second compressed data to the orchestrator device;
receiving, by the orchestrator device during the second time period from the storage system, the second compressed data;
performing, by the orchestrator device during the second time period, the data decompression operations on the second compressed data to provide second decompressed data; and
providing, by the orchestrator device during the second time period, the second decompressed data to the host operating system.

15. The method of claim 14, further comprising:
retrieving, by the orchestrator device during the second time period from the storage system via the network, compression metadata for the second compressed data, wherein the orchestrator device selects the orchestrator device to perform the data decompression operations on the second compressed data using each of the data read decompression policy, the second decompression availability message, and the compression metadata for the second compressed data.

16. The method of claim 15, further comprising:
determining, by the orchestrator device, that the second compressed data exceeds a data size threshold and, in response, retrieve the compression metadata.

17. The method of claim 14, further comprising:
receiving, by the orchestrator device from the storage system via the network, storage system operating information, wherein the orchestrator device selects the storage system to perform the data decompression operations on the first compressed data using each of the data read decompression policy, the first decompression availability message, and the storage system operating information.

18. The method of claim 14, further comprising:
receiving, by the orchestrator device during a third time period from the storage system, a first compression availability message;
receiving, by the orchestrator device during the third time period from the host operating system prior to receiving the first read instruction, a first write instruction to perform a first write operation in the storage system using first data that is included in the first write instruction;
retrieving, by the orchestrator device during the third time period from the orchestrator database in the orchestrator device in response to receiving the first write instruction, a data write compression policy;
selecting, by the orchestrator device during the third time period using the data write compression policy, at least one of the storage system and the orchestrator device to perform the data compression operations on the data; and
providing, by the orchestrator device to the storage system via the network along with the first data, a first data write compression instruction that is configured to cause the storage system to performs the data compression operations on the first data to provide the first compressed data and store the first compressed data in at least one of the plurality of disaggregated storage devices included in the storage system;
receiving, by the orchestrator device during a fourth time period from the storage system, a second compression availability message;
receiving, by the orchestrator device during the fourth time period from the host operating system prior to receiving the second read instruction, a second write instruction to perform a second write operation in the storage system using second data that is included in the second write instruction;
retrieving, by the orchestrator device during the fourth time period from the orchestrator database in the orchestrator device in response to receiving the second write instruction, the data write compression policy;
selecting, by the orchestrator device during the fourth time period using the data write compression policy and the second compression availability message, the orchestrator device to perform the data compression operations on the second data;
performing, by the orchestrator device during the fourth time period, the data compression operations on the second data to provide the second compressed data; and
providing, by the orchestrator device during the fourth time period to the storage system, the second compressed data along with a second data write compression instruction that is configured to cause the storage system to store the second compressed data in at least one of the plurality of disaggregated storage devices included in the storage system.

19. The method of claim 14, wherein the method further comprises:
generating, by the orchestrator device along with performing the data compression operations on the second data to provide the second compressed data, compression metadata for the second compressed data; and
providing, by the orchestrator device to the storage system via the network, the compression metadata for the second compressed data in the second data write compression instruction.

20. The method of claim 19, wherein the compression metadata for the second compressed data includes at least one of a compression algorithm that was used to compress the second compressed data, a compressed size of the second compressed data, a decompressed size of the second compressed data, and a checksum for the second compressed data.

* * * * *

UNITED STATES PATENT AND TRADEMARK OFFICE
CERTIFICATE OF CORRECTION

PATENT NO. : 12,105,954 B2
APPLICATION NO. : 17/864118
DATED : October 1, 2024
INVENTOR(S) : Chen et al.

It is certified that error appears in the above-identified patent and that said Letters Patent is hereby corrected as shown below:

In the Specification

Column 8, Line 27, "Input/Output (TO)" should read --Input/Output (IO)--

In the Claims

Claim 2, Column 31, Lines 18-19, "the LCS orchestrator device" should read --the orchestrator device--

Claim 3, Column 31, Lines 29-30, "the LCS orchestrator device" should read --the orchestrator device--

Claim 5, Column 31, Line 65, "to performs" should read --to perform--

Claim 8, Column 33, Lines 41-42, "the LCS orchestrator engine" should read --the orchestrator engine--

Claim 11, Column 34, Line 15, "to performs" should read --to perform--

Claim 18, Column 36, Line 40, "to performs" should read --to perform--

Signed and Sealed this
Third Day of December, 2024

Katherine Kelly Vidal
*Director of the United States Patent and Trademark Office*